(12) United States Patent
Langston et al.

(10) Patent No.: US 11,680,407 B2
(45) Date of Patent: Jun. 20, 2023

(54) SYSTEMS AND METHODS FOR POST-TENSIONING IN CONCRETE SUPPORT SYSTEMS

(71) Applicants: POST TECH MANUFACTURING, LLC, Fort Worth, TX (US); Nicor Inc., Dripping Springs, TX (US)

(72) Inventors: Evan Langston, Fort Worth, TX (US); Bryant Morgan, Maryland Heights, MO (US); Jeffrey Alan Cook, Dripping Springs, TX (US)

(73) Assignees: POST TECH MANUFACTURING, LLC, Fort Worth, TX (US); Nicor Inc., Dripping Springs, TX (US)

( * ) Notice: Subject to any disclaimer, the term of this patent is extended or adjusted under 35 U.S.C. 154(b) by 0 days.

(21) Appl. No.: 17/445,411

(22) Filed: Aug. 19, 2021

(65) Prior Publication Data

US 2021/0381239 A1    Dec. 9, 2021

Related U.S. Application Data

(63) Continuation-in-part of application No. 17/303,154, filed on May 21, 2021, and a continuation-in-part of
(Continued)

(51) Int. Cl.
*E04C 5/12* (2006.01)
*E04G 21/12* (2006.01)
(Continued)

(52) U.S. Cl.
CPC .............. *E04C 5/122* (2013.01); *E04C 5/12* (2013.01); *E04C 5/125* (2013.01); *E04C 5/162* (2013.01);
(Continued)

(58) Field of Classification Search
CPC . E04C 5/162; E04C 5/12; E04C 5/122; E04C 5/163; E04C 5/161; E04C 5/125; E04G 21/12
See application file for complete search history.

(56) References Cited

U.S. PATENT DOCUMENTS

| 3,588,045 A | 6/1971 | Stubbs | |
| 3,833,706 A * | 9/1974 | Edwards | .................. E04C 5/12 |
| | | | 52/223.13 |

(Continued)

FOREIGN PATENT DOCUMENTS

| CA | 3076651 A1 * | 9/2020 | ............. E04C 5/122 |
| EP | 2096223 A2 * | 9/2009 | ............... E04C 5/12 |

(Continued)

OTHER PUBLICATIONS

International Search Report and Written Opinion; Application No. PCT/US2021/070192; dated Jul. 14, 2021; 10 page; Alexandria, Virginia, USA.

*Primary Examiner* — Jessie T Fonseca
(74) *Attorney, Agent, or Firm* — Whitaker Chalk Swindle & Schwartz PLLC; Decker A. Cammack

(57) ABSTRACT

A system, method, and apparatus for post-tensioning in masonry-based system, especially concrete support systems. In one embodiment, a system is presented that can include an anchor, pocket-former, and bolt, wherein the pocket-former can be configured to engage each of the anchor and bolt to facilitate securing of the system to a form. In another embodiment, a method of post-tensioning is presented, wherein a tendon can be suspended at the live end via connections facilitated by a pocket-former. In another embodiment, a system and method of post-tensioning is presented that prevents a pocket and anchor from being
(Continued)

contaminated with debris that could ultimately compromise the integrity of the tensioned material.

13 Claims, 20 Drawing Sheets

Related U.S. Application Data application No. PCT/US2021/070192, filed on Feb. 25, 2021.

(60) Provisional application No. 63/044,433, filed on Jun. 26, 2020, provisional application No. 62/982,413, filed on Feb. 27, 2020.

(51) Int. Cl.
    *E04C 5/16* (2006.01)
    *F16B 7/18* (2006.01)

(52) U.S. Cl.
    CPC .............. *E04C 5/163* (2013.01); *E04G 21/12* (2013.01); *F16B 7/182* (2013.01); *E04C 5/161* (2013.01)

(56) References Cited

U.S. PATENT DOCUMENTS

| | | | | |
|---|---|---|---|---|
| 3,956,797 A | * | 5/1976 | Brandestini | E04C 5/122 52/223.13 |
| 4,053,974 A | * | 10/1977 | Howlett | E04C 5/122 52/223.13 |
| 4,773,198 A | * | 9/1988 | Reinhardt | E04C 5/122 52/223.13 |
| 5,072,558 A | * | 12/1991 | Sorkin | E04C 5/12 52/223.13 |
| 5,440,842 A | * | 8/1995 | Sorkin | E04C 5/12 52/223.13 |
| 5,897,102 A | * | 4/1999 | Sorkin | E04C 5/12 52/223.13 |
| 6,023,894 A | * | 2/2000 | Sorkin | E04C 5/122 249/43 |
| 6,322,281 B1 | | 11/2001 | Jungwirth et al. | |
| 6,393,781 B1 | * | 5/2002 | Sorkin | E04C 5/122 52/223.13 |
| 6,817,148 B1 | | 11/2004 | Sorkin | |
| 7,360,342 B2 | | 4/2008 | Hayes et al. | |
| 7,424,792 B1 | | 9/2008 | Sorkin | |
| 7,676,997 B1 | | 3/2010 | Sorkin | |
| D615,219 S | * | 5/2010 | Sorkin | D25/199 |
| 7,797,895 B1 | | 9/2010 | Sorkin | |
| 7,841,140 B1 | | 11/2010 | Sorkin | |
| 7,950,196 B1 | | 5/2011 | Sorkin | |
| 7,963,078 B1 | * | 6/2011 | Sorkin | E04C 5/122 403/374.1 |
| 8,069,624 B1 | | 12/2011 | Sorkin | |
| 8,087,204 B1 | * | 1/2012 | Sorkin | E04C 5/122 52/223.13 |
| 8,251,344 B1 | * | 8/2012 | Sorkin | E04C 5/122 52/223.13 |
| 9,163,405 B2 | | 10/2015 | Mathews et al. | |
| 9,982,434 B1 | * | 5/2018 | Crigler | F16M 13/02 |
| 2005/0284050 A1 | * | 12/2005 | Hayes | E04C 5/12 52/223.13 |
| 2009/0205273 A1 | | 8/2009 | Hayes et al. | |
| 2017/0016231 A1 | * | 1/2017 | Sorkin | B28B 23/043 |
| 2017/0204607 A1 | * | 7/2017 | Schmidt | E04C 5/122 |
| 2018/0155923 A1 | * | 6/2018 | Sorkin | E04B 1/66 |
| 2018/0291628 A1 | * | 10/2018 | Butts | E04C 5/125 |
| 2018/0313086 A1 | * | 11/2018 | Mathews | E04C 5/122 |
| 2019/0145103 A1 | * | 5/2019 | Brewer | E04C 5/12 52/223.13 |
| 2019/0242132 A1 | * | 8/2019 | Beaver | E04C 5/12 |
| 2021/0293023 A1 | * | 9/2021 | Sorkin | E04C 5/122 |

FOREIGN PATENT DOCUMENTS

| | | | | |
|---|---|---|---|---|
| EP | 3118386 A1 | * | 1/2017 | ............. E04C 5/122 |
| EP | 3222793 A1 | * | 9/2017 | ............... E04C 5/12 |
| EP | 3885507 A1 | * | 9/2021 | ............. E04C 5/122 |
| WO | WO-9111569 A | * | 8/1991 | ............. B29C 45/14 |

* cited by examiner

SYSTEMS AND METHODS FOR POST-TENSIONING IN CONCRETE SUPPORT SYSTEMS

BACKGROUND

1. Field of the Disclosure

The present disclosure relates to a system, method, and apparatus for post-tensioning masonry-based support systems, such as concrete support systems. The disclosure discussed herein has applicability to systems that employ a simple two-anchor system having a dead end and a live end, as well as systems that employ intermediate anchors, such as would be need for high-strength and/or large slab applications.

2. Background of the Disclosure

Construction with concrete has been prevalent in both commercial and residential applications for more than a century. As construction methods have evolved, so has the composition and use of structural concrete. Concrete has enormous compressive strength, but historically has needed beam construction to support tensile and lateral strength. While simple and economical, a post-and-beam structure, designed to support floors and/or roofs made of concrete slabs, are unsightly, and unnecessarily reduce usable square footage within the square footage of the concrete slab by taking up valuable space. Accordingly, various methods have been created to increase the tensile strength of concrete. One method of increasing the tensile strength of concrete has been to add rebar, or steel rods, within the concrete. However, this method is only marginally successful at increasing the tensile strength.

Two of the simpler and more-effective slab-strengthening methods are known as pre-tensioning and post-tensioning. Pre-tensioning occurs in a controlled shop environment where strands of wire, or tendon, are stretched from end-to-end of a form, and then concrete is poured around the pre-stretched tendons. When the concrete cures, it adheres to the tendons, which provide compressive force along the axis of the tendon, thus increasing the tensile strength of the concrete slab.

Post-tensioning is a more cost effective and efficient method of reinforcing concrete slabs as compared to pre-tensioning. In post-tensioning, a tendon is anchored at one end of a slab form-a fixed end—and is laid along an axis of the form in an unstressed state. The tendon is housed in a sheath, which allows the tendon to move freely within the sheath. In most cases, the tendon is surrounded by heavy grease to assist its longitudinal movement within the sheath. Concrete is then poured within the form surrounding the tendon. Once the concrete has been poured into the form at the construction site, the tendon is tensioned with a jack at an anchor at the opposite end of the tendon from the fixed end. This second anchor is known as the "live end." The live-end anchor is generally attached to a form or form board via nails that are driven through holes in the anchor and into the form, securing the anchor to the form. Other methods utilize a hollow tube that extends through both the form board and pocket former to affix itself to the anchor, with the tendon running the length of the tube. Tendons are generally placed in the formwork after reinforcing rebar is placed. There may be one or more intermediate anchors within the slab, depending on the span covered by the tendon. Typically, strands of tendons are placed perpendicular to one another to tension the concrete slab along both a vertical and horizontal axis along the plane of the slab. The benefits to post-tensioning are numerous. First, post-tensioning allows the slab to be formed and poured on site, ensuring that the form is exactly correct in its dimensions. Second, because the slab is poured on site, transportation costs are reduced because finished pre-tensioned slabs require extremely large vehicles to move them from shop to site. Additionally, but not exhaustively, pre-tensioning is dangerous in a shop environment, because thousands of pounds of force are applied to a pre-tensioned tendon with nothing to prevent it from harming workers in the event it snaps before the concrete is poured. In post-tensioning, the tendon is unstressed when the concrete is poured, so in the event of a tendon failure during tensioning, it is surrounded by a large amount of concrete, which prevents the tendon from whipping out of the form.

When the post-tensioning system is tensioned, a tail of tendon extends through the live-end anchor. Typically, a jack is affixed to the end of the tendon at a device called a pocket former. The pocket former ensures that once the concrete is poured, there is sufficient space to install the jack by preventing the ingress of concrete into the area where the tendon protrudes through the live-end anchor. Wedges are installed around the tail of the tendon, which will have no sheathing. The wedges typically have beveled "teeth" facing the tail end, such that when the tendon is released, the wedges in the anchor cavity seat, grab the tendon by biting into the metal cable strands, and prevent the tendon from retracting after tensioning. Once the desired tension is achieved, the tendon is cut as close to the anchor cavity as possible.

One significant problem with both pre-tensioned and post-tensioned systems is corrosion. Concrete slabs are used in a variety of applications, almost all of which are exposed to the elements at some point. Because the cables must be made of mild steel or a similar material (to allow for stretching and tensioning), and the use of stainless steel for cables and anchors is cost-prohibitive, corrosion is a concern. Accordingly, the use of sheathing for the tendons and polymer encased anchors has become standard practice in the post-tensioning industry. Further, after a tendon is sheared, it is advisable to cover the severed tail (and the inside of the anchor from which it protrudes) to protect the components from corrosion.

Because of this issue with corrosion, another problem with current anchors is the use of nails to affix the anchors to the form boards. Most construction workers are incentivized to work very quickly. Therefore, as they are nailing the anchors into the form boards, nails are often not driven perfectly straight, comprising the integrity of the connection to the form; further, when hammered, the nails may tear the polymer encapsulation about the anchor. In such a case, the polymer is compromised, potentially exposing the anchor to corrosive elements. Additionally, other potential methods of securing anchors to forms are not efficient, potentially requiring an elongated hollow bolt that travels all the way through a pocket-former and into an anchor. Such contraption can be problematic because of the seal (or lack thereof) between the pocket-former and anchor—if this seal is not accomplished correctly, slurry can egress into the cavity and interfere with the tensioning of the cable, as well as ultimately compromise the integrity of the post-tensioning system by contaminating the interaction between the anchor and the tendon.

A portion of a tendon that is particularly vulnerable to corrosion is at the juncture of the strand and anchor. Generally, a coupler is utilized to seal the connection between these two portions of the tendon to mitigate the egress of moisture that could lead to debilitating corrosion. A commonly used coupler is a hear shrink coupler or heat shrink. A heat shrink tube is placed over the junction of the anchor and sheath, and a high temperature (e.g., 125° C. or more) is applied to cause the heat shrink tube to contract and bond to the anchor and strand. However, this can be very problematic, as anchors, the sheath, etc. are often either encapsulated in a type of plastic or themselves made from plastic, and application of heat can compromise the integrity of these elements, creating opportunities for corrosion. The couplers are also generally installed hundreds of miles away from the job site (i.e. the anchors, strands, and couples are combined to form pre-fabricated tendons), and the couplers can often be compromised by the varying weather conditions that tendons are exposed to while being shipped to the job site. For example, the sheathing of a strand can dislodge from the coupler because the coupler contracts too far or expands due to the climate it is exposed to. Further, couplers can be damaged by preplaced rebar and must be repaired with, e.g., tape, which can often be only minimally successful and leave the tendon exposed to the elements. Additionally, sizing couplers can be difficult, as sheathing thickness varies greatly from manufacturer to manufacturer. Some attempts to address these issues with preventing corrosion in sheathed tendons can be seen in U.S. Pat. Nos. 7,797,895; 7,841,140; and 7,950,196, which are herein incorporated by reference in their entireties.

SUMMARY OF THE INVENTION

In one embodiment, the present disclosure can comprise a post-tensioning system. The system can comprise an anchor member; a pocket-former member comprising a first end and a second end; a bolt member comprising a first end, a second end, and a flange; and a cold shrink member. The first end of the pocket-former member can be configured to engage the anchor member, and the second end of the pocket-former member can be configured to engage the second end of the bolt member.

In another embodiment, the present disclosure comprises a method of providing support to a masonry structure. The method can comprise the steps of: providing an anchor member; engaging the anchor member with a first end of a pocket-former member; and engaging a second end of the pocket-former member with a bolt member, wherein engaging the pocket-former member with the bolt member secures the pocket-former member to a form.

In another embodiment, the present disclosure can comprise a pocket-former apparatus. The apparatus can comprise a pocket-former member comprising a first end, a second end, an inner tube, and an outer tube; an anchor member; and a bolt member comprising a first end, a second end, and a washer. The first end of the pocket-former can be configured to engage the anchor member. The second end of the pocket-former member can be configured to engage the second end of the bolt member.

In another embodiment, the present disclosure can comprise a cold shrink apparatus. The apparatus can comprise a leading end, a trailing end, a sleeve member, and a dilator, wherein the sleeve member can be operable to contract upon removal of the dilator.

DETAILED DESCRIPTION OF THE INVENTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1A:
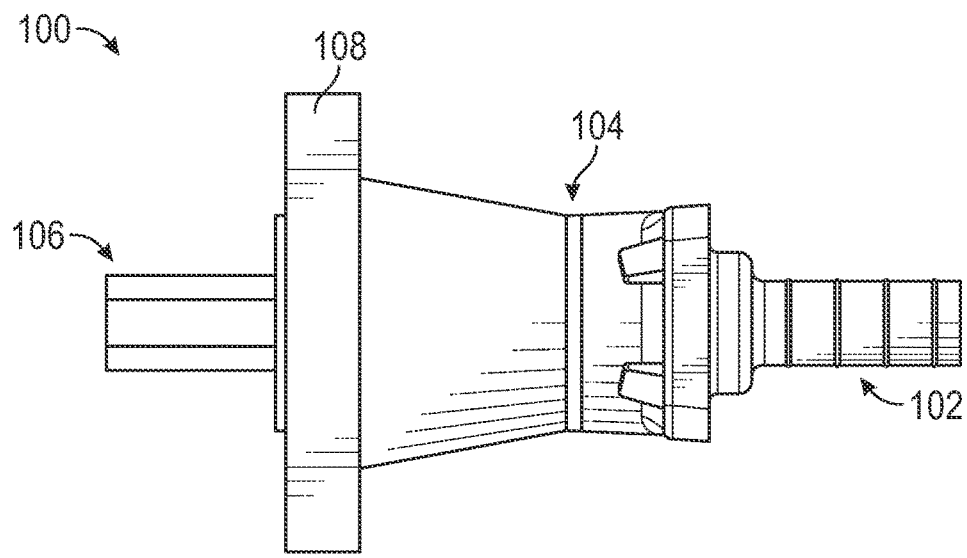
FIG. 1A shows a perspective view of an example of a post-tensioning system or pocket-forming apparatus in accordance with the principles of the present disclosure, wherein an anchor member, pocket-former member, and bolt member can be installed around a form board.
Figure 1B:
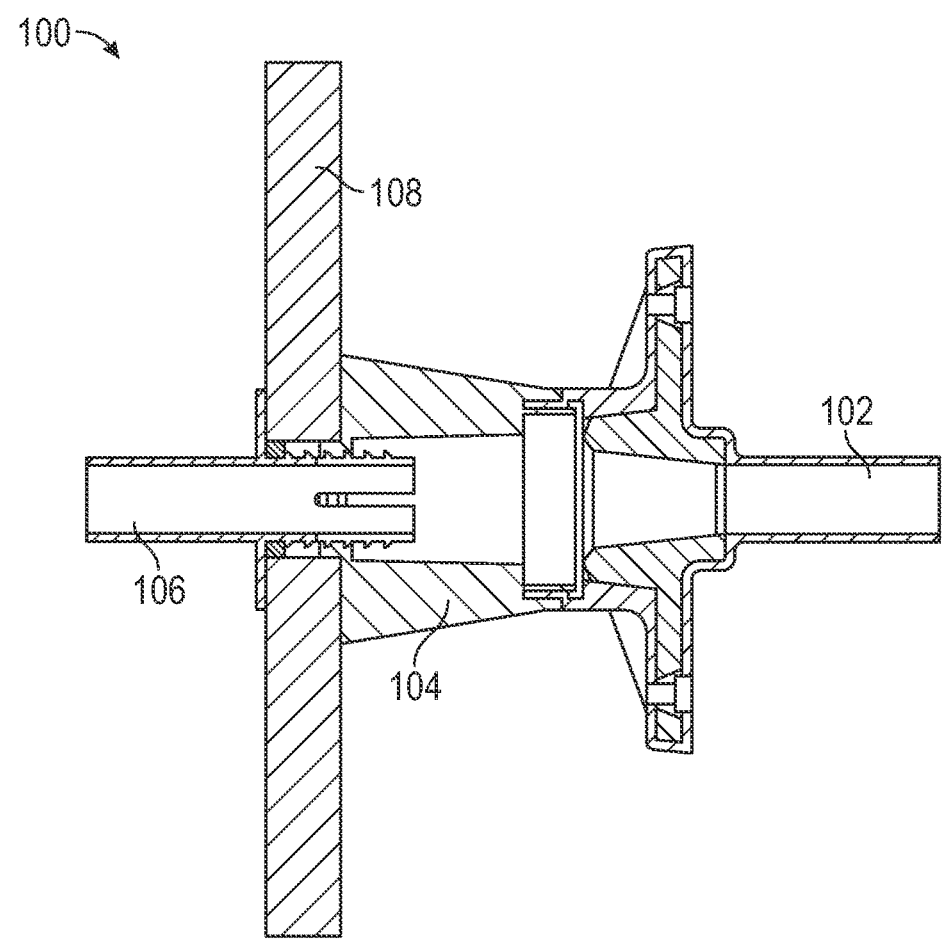
FIG. 1B shows a cross-sectional view of the exemplary post-tensioning system or pocket-former apparatus of FIG. 1A.
Figure 1C:
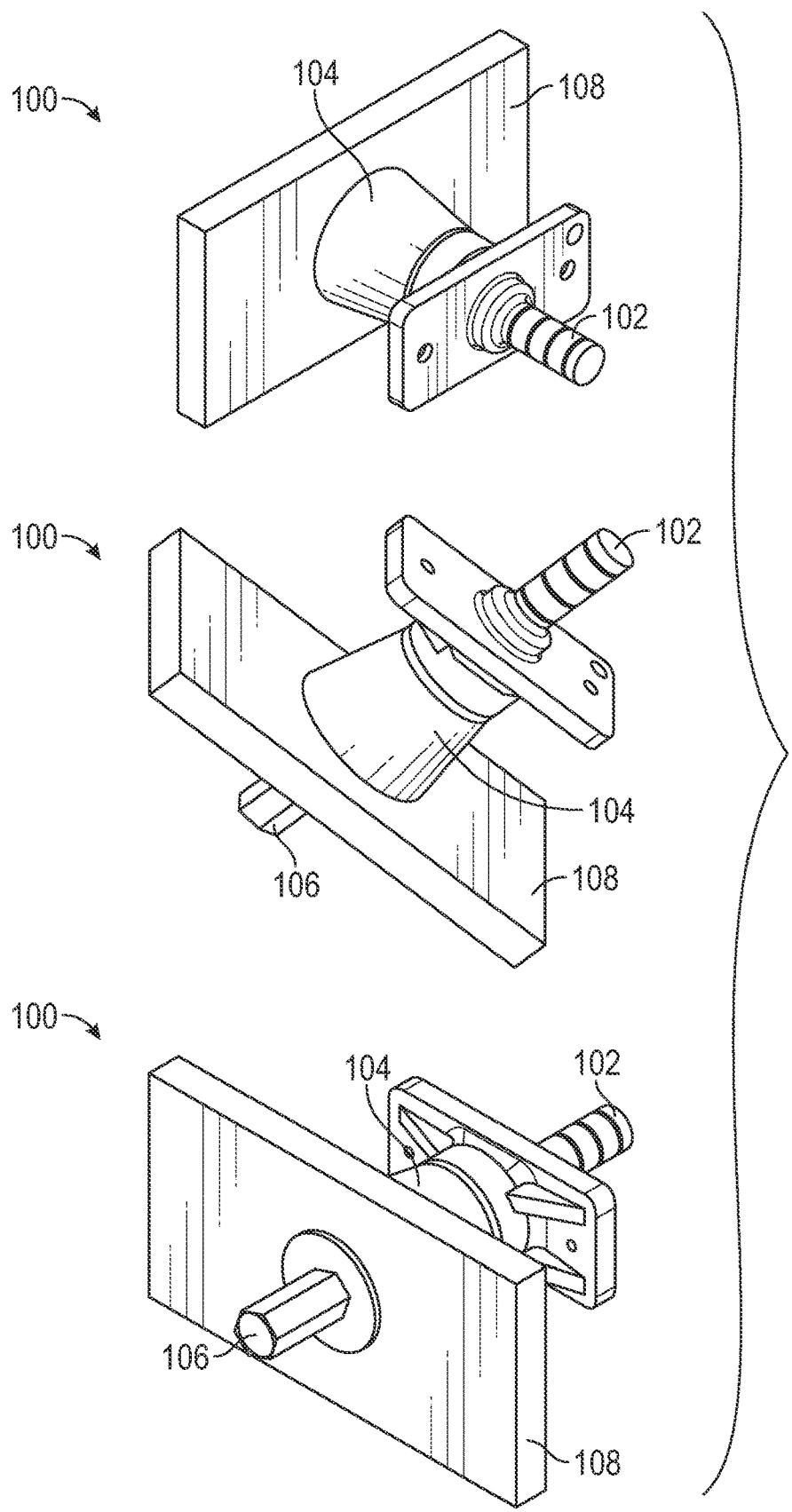
FIG. 1C shows a number of perspective views of the exemplary post-tensioning system or pocket-former apparatus of FIG. 1A.

FIGS. 1A-1C depict an embodiment of the present disclosure. FIG. 1A depicts a perspective view of a post-tensioning system 100 or pocket-former apparatus 100 that can comprise an anchor (anchor member) 102, pocket-former (pocket-former member) 104, a bolt (bolt member) 106, and a cap (cap member) (not shown in FIGS. 1A-1C); FIG. 1B depicts a cross-sectional view of the system 100 of FIG. 1A, and FIG. 1C depicts perspective views of the system 100. In one embodiment, a form (concrete form) (form board) 108 can be disposed between the pocket-former 104 and the bolt 106. In one embodiment, the anchor 102, pocket-former 104, and bolt 106 can be similar to those known in the art. For example, the anchor 102 can facilitate the tensioning of a tendon within a slab, the pocket-former 104 can enable the creation of a pocket around the anchor such that tendon shears (like those known in the art) can cleave the live end of the tendon, and the bolt can facilitate temporary attachment of the pocket-former 104 to the form 108.

As an example, the system 100 can facilitate the securing of a tendon (not shown) to a form 108. In one embodiment, an anchor and strand, once coupled together, can be considered a tendon. In one embodiment, an anchor 102 can, for example, suspend the tendon between the anchor 102 of the system 100 and another anchor. In another embodiment, the system 100 can be considered the live end of a post-tensioning system. In one embodiment, the anchor 102 can be configured to engage a pocket-former 104, and the pocket-former 104 can then be configured to engage a bolt 106. As shown in FIGS. 1A-1C, the engaging of the pocket-former 104 with both the anchor 102 and the bolt 106 can enable the securing of the system 100 and a tendon extending therethrough to the form 108.

Figure 2A:
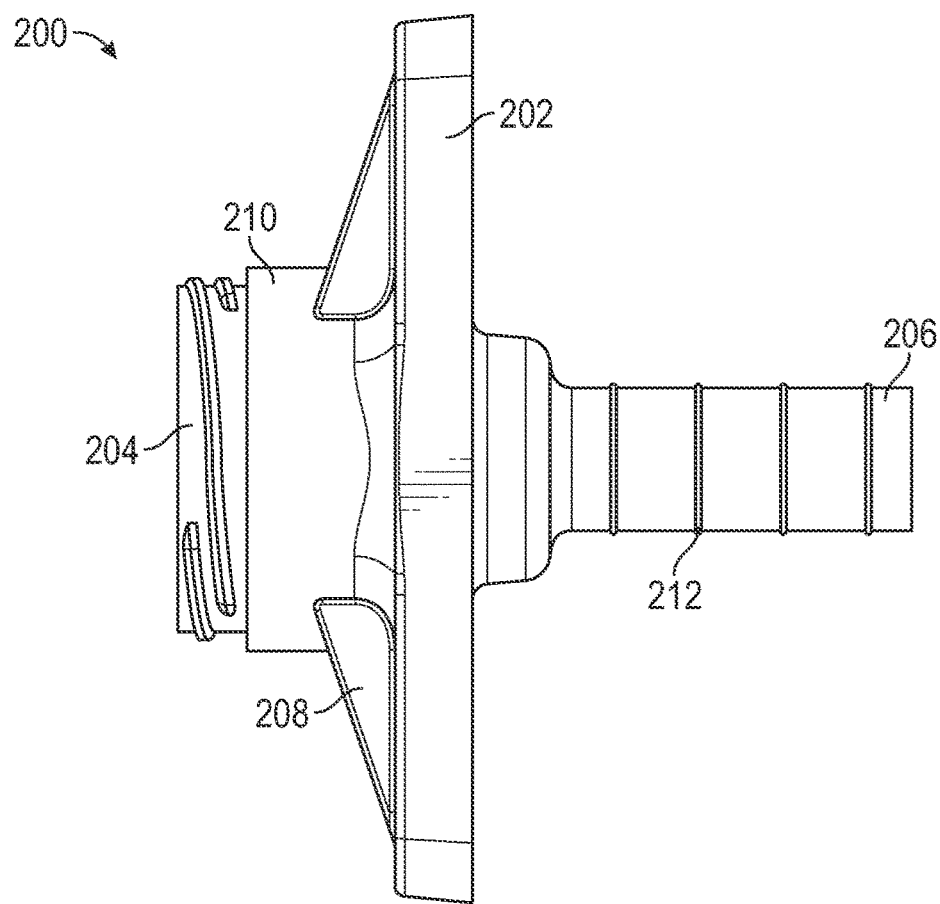
FIG. 2A depicts a perspective view of an exemplary anchor or anchor member comprising a collar accordance with the principles of the present disclosure.
Figure 2B:
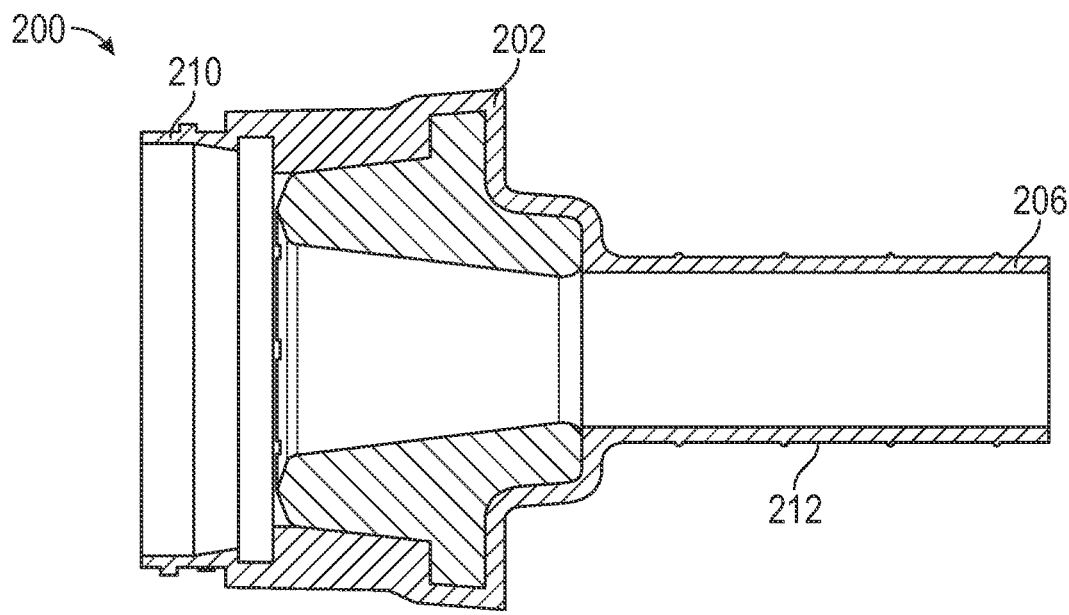
FIG. 2B depicts a cross-sectional view of the exemplary anchor of FIG. 2A.
Figure 2C:
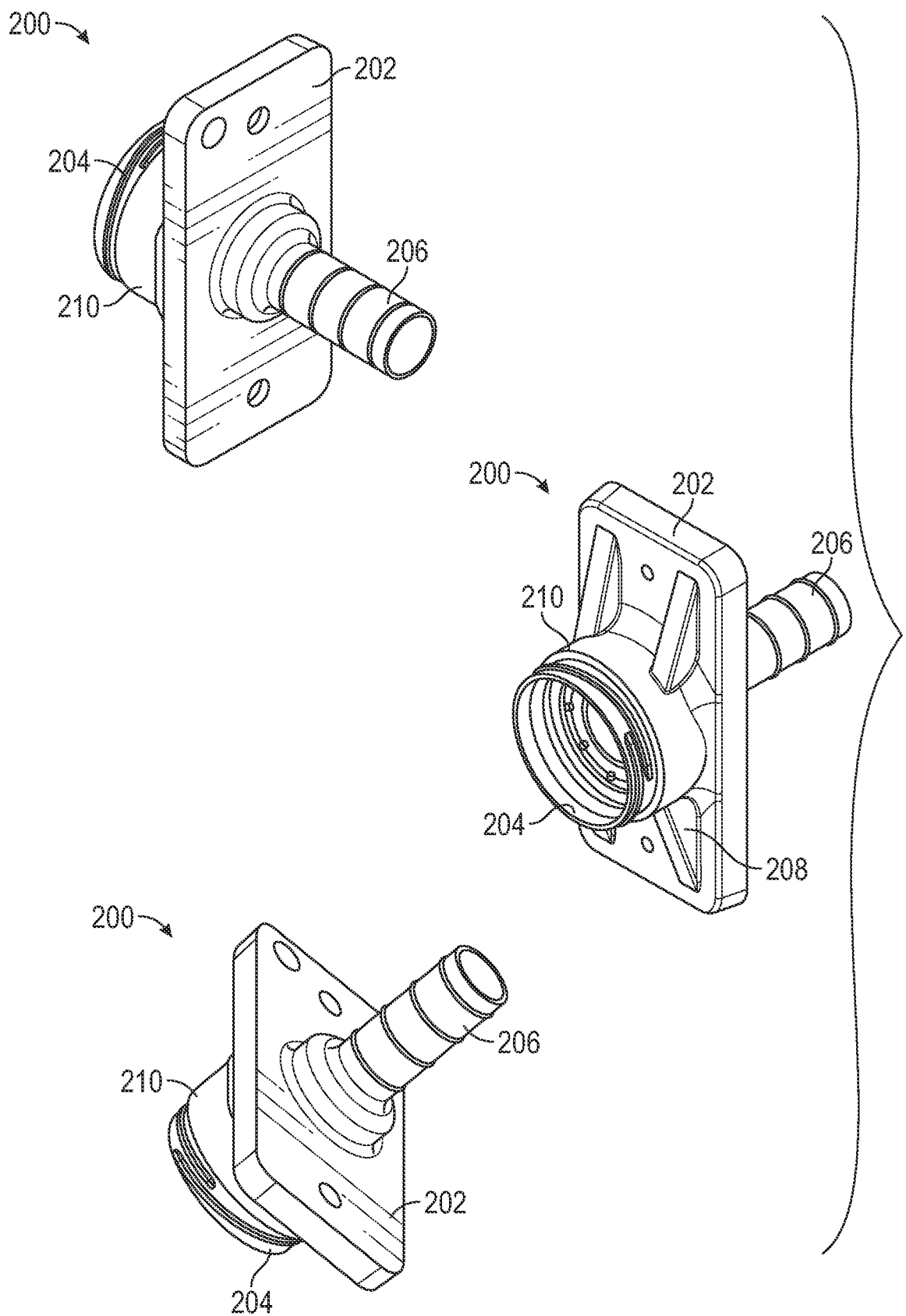
FIG. 2C depicts a number of perspective views of the exemplary anchor of FIG. 2A.

FIGS. 2A-2C depict another embodiment of the present disclosure. An anchor (anchor member) 200 can include a canular portion (tube) 206, a flange 202, a gusset 208, a collar 210, and a first part of a coupling mechanism 204; in one embodiment, the first part of the coupling mechanism can be collar threads 204. In one embodiment, the anchor 200 can be made of iron, steel, titanium, or any other metal or material suitable to facilitate the tensioning of a material that the tending within the anchor 200 is within. In another embodiment, the anchor 200 can be made of metal and encapsulated in a plastic, polymer, or any other material suitable to protect the anchor 200 from corrosion, such as can be seen in U.S. Pat. Nos. 6,817,148; 7,424,792; and 7,676,997, which are herein incorporated by reference in their entireties. For example, the anchor 200 can be similar to anchors known in the art, wherein the flange 202 can spread force over a wider area of the slab being tensioned, the gusset 208 can provide support for the flange 202, and the canular portion 206 can cover a portion of a strand that is inserted therein and ultimately participate in a bonding or connection, such as via heat shrink or cold shrink in a manner known in the art, with a sheath of the tendon to protect the tendon from corrosion. In one embodiment, the canular portion 206 can be configured to engage a strand or sheathed strand. For example, example, the inner diameter of the canular portion 206 can be the same or slightly larger than, e.g., the outer diameter of a sheath of a strand, such that the sheath of the strand can insert into canular portion 206. In another example, the outer diameter of the canular portion 206 can be slightly smaller than the inner diameter of a sheath of a sheathed strand, such that the canular portion 206 can snugly insert into the sheath. In one embodiment, the anchor 200 can be over-molded, and the over-molding can form the canular portion 206. In one embodiment, the canular portion 206 can be a corrosion-protecting tube or canula extending out therefrom; in another embodiment, the canular portion 206 can be no more than four inches in length. In one embodiment, the canular portion 206 can serve several purposes, such as guiding a sheathed or unsheathed strand into the anchor 200. In another embodiment, the canular portion 206 can also deter the creep of moisture into the anchor 200, which if left unchecked, could make its way towards the anchor cavity (i.e. the area of the anchor 200 in which a strand sits), causing rust and compromising the bond between the anchor 200 and the strand.

Figure 11A:
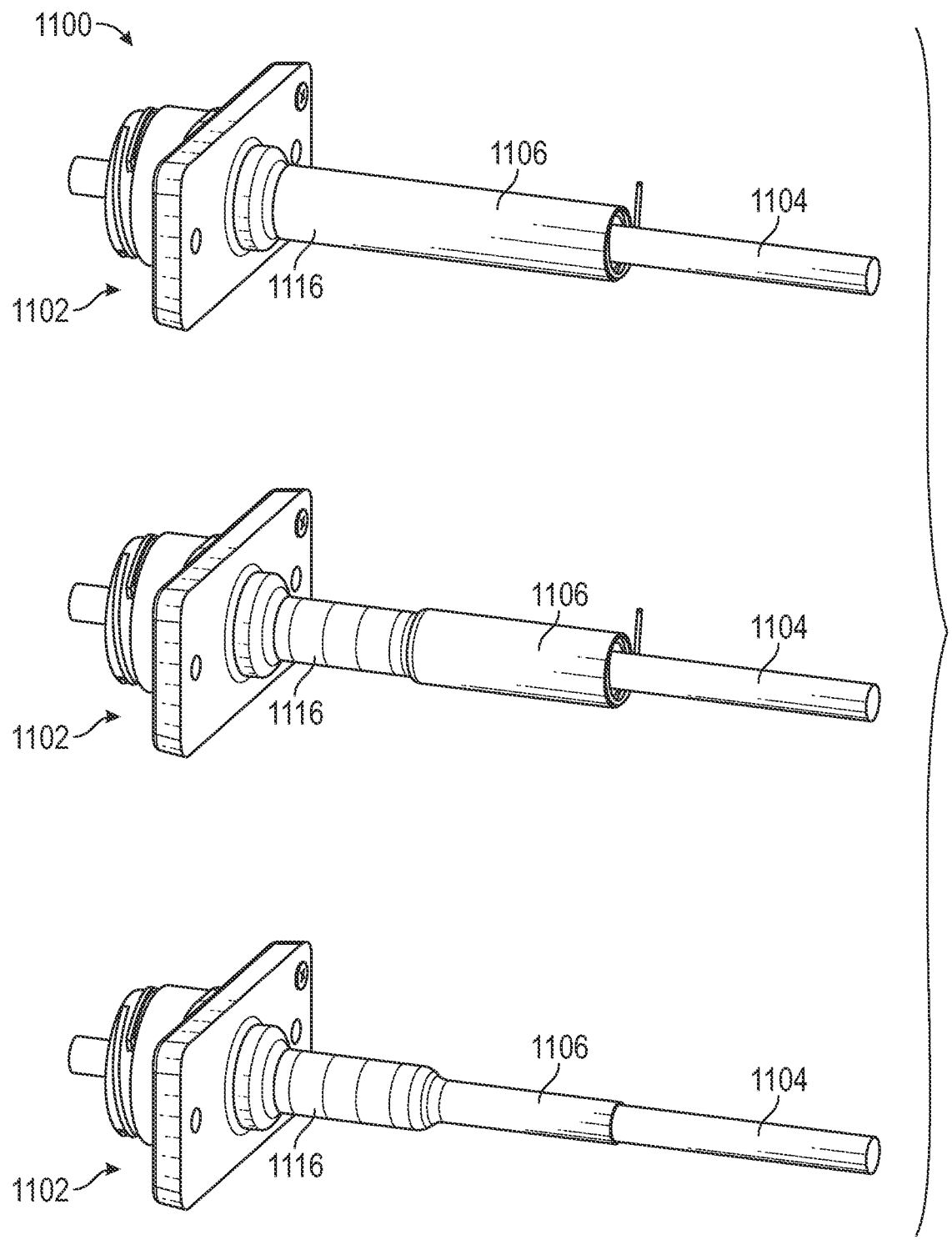
FIG. 11A depicts a perspective view of an exemplary post-tensioning system including a cold shrink apparatus, in accordance with the principles of the present disclosure.
Figure 11B:
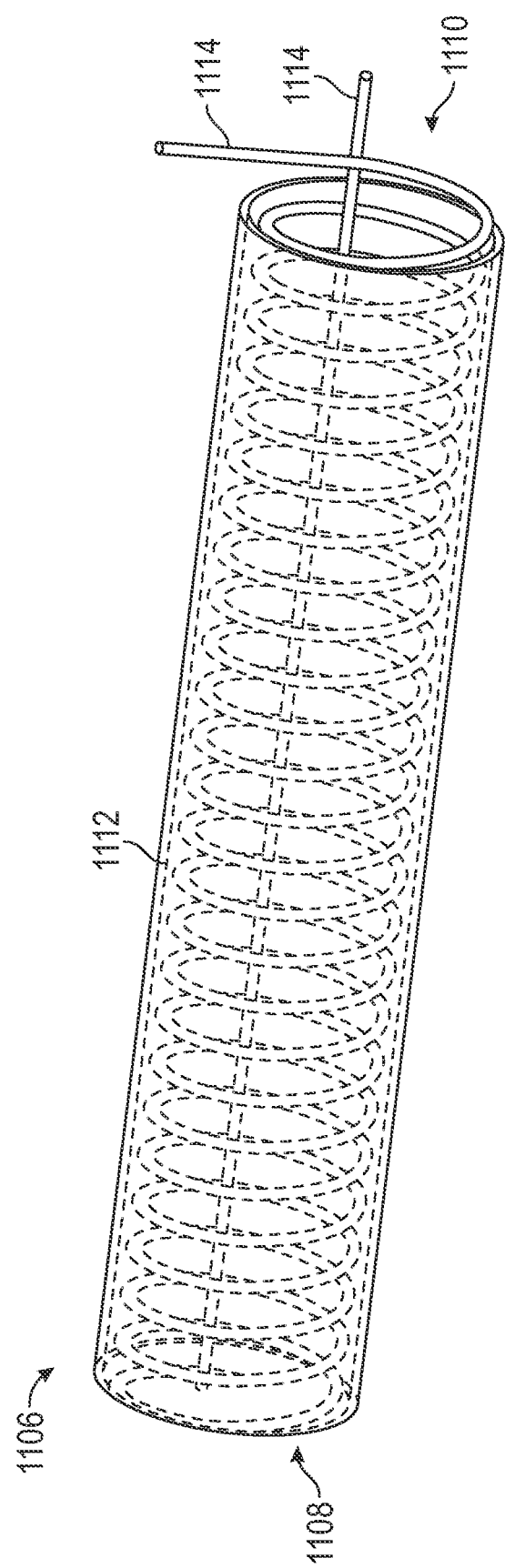
FIG. 11B depicts a perspective view of a cold shrink apparatus in accordance with the principles of the present disclosure.

In another embodiment, the tube 206 can serve as a guide to preinstall, e.g., a cold shrink member (such as the cold shrink apparatus 1106 depicted in FIGS. 11A-11B). For example, and in one embodiment, the canular portion 206 can include embossing 212 such as ridges, texturing, or corrugation 212 along the tube's 206 length which can be operable to act as a guide to the installer. For example, ridges 212 can contact the inside of a cold shrink apparatus and, in one embodiment, emboss the apparatus as it is being pre-installed, such that an installer can view where on the canular portion 206 the apparatus sits. In another embodiment, the canular portion 206 can be configured to engage a wrap, cover, sleeve, jacket, or any other corrosion-prevention device or coupler or sealant know in the art, such as those meant to secure a connection between the anchor 200 and a strand. In another embodiment, the canular portion 206 can be configured to engage a cold shrink apparatus like that in FIGS. 11A-11B. For example, the canular portion 206 can be operable to receive an adhesive along its length, such that the cold shrink can be secured thereon. In another example, an outer diameter of the canular portion 206 can be the same size or slightly smaller than the inner diameter of a cold shrink apparatus, such that the apparatus can engage or snugly engage with the canular portion 206. In another example, the canular portion 206, via the embossing 212 or any other suitable design or mechanism, can engage the inside of a cold shrink apparatus, such that the apparatus can be maintained on the canular portion 206 while, for example, a strand is inserted therethrough. In another embodiment, the canular portion 106 can facilitate preinstallation of the cold shrink apparatus, such as by, for example, maintaining the position of the cold shrink apparatus prior to removal of the dilator as discussed in FIGS. 11A-11B. In another embodiment, the canular portion 206 can facilitate bonding of a cold shrink apparatus to the anchor 200. For example, embossing 212, ridges 212, texturing 212, corrugation 212, threads 212 to receive corresponding threads on the inside of jacket or cold shrink apparatus, or any other suitable design or mechanism can provide grip to a cold shrink apparatus installed thereon. In another example, the canular portion 206 can include any type of embossing 212 operable to minimize movement or lateral movement of the cold shrink apparatus along the canular portion 206. For example, such movement can be restricted slightly when the cold shrink is preinstalled (such that the cold shrink can snugly engage the canular portion 206), and once the dilator of the cold shrink is removed, the movement of the cold shrink can be significantly restricted, such that viscoelastic properties of the cold shrink can contribute to a structured flexibility of the tendon.

In one embodiment, the anchor 200 can include a coupling mechanism 204 to facilitate coupling of the anchor 200 to another part of a post-tensioning system. For example, the coupling mechanism can be threads (collar threads), a latch, a seal, a clamp, a magnet, a quick-connect, or any other type of mechanism suitable to couple the anchor 200 to a corresponding component. For example, the anchor 200 can include collar threads 204 that correspond to threads on, for example, a pocket-former. Such a mechanism is advantageous, as it enables the anchor 200 to be easily secured to, for example, a form, replacing previous methods of securing an anchor to form via, for example, nails driven through holes in the flange and into the form. In one embodiment, the coupling between the anchor 200 and the corresponding component can be impervious to liquids or slurries, for example, concrete slurry, such that no liquid or slurry can penetrate the connection.

Figure 3A:
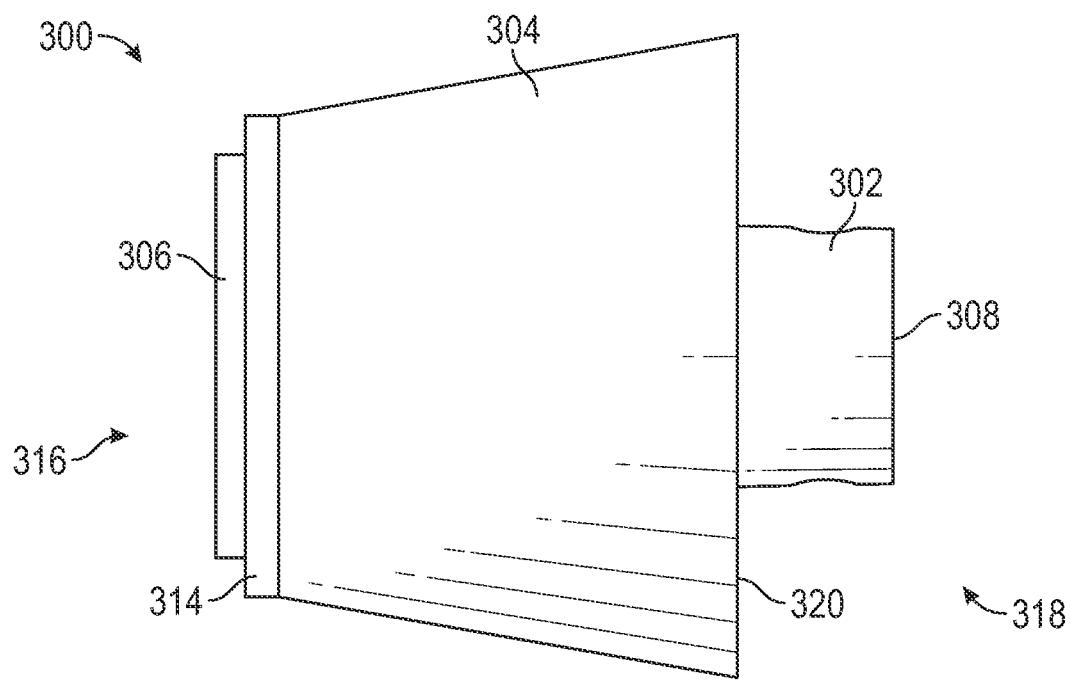
FIG. 3A depicts a perspective view of an exemplary pocket-former comprising a first end and a second end in accordance with the principles of the present disclosure.
Figure 3B:
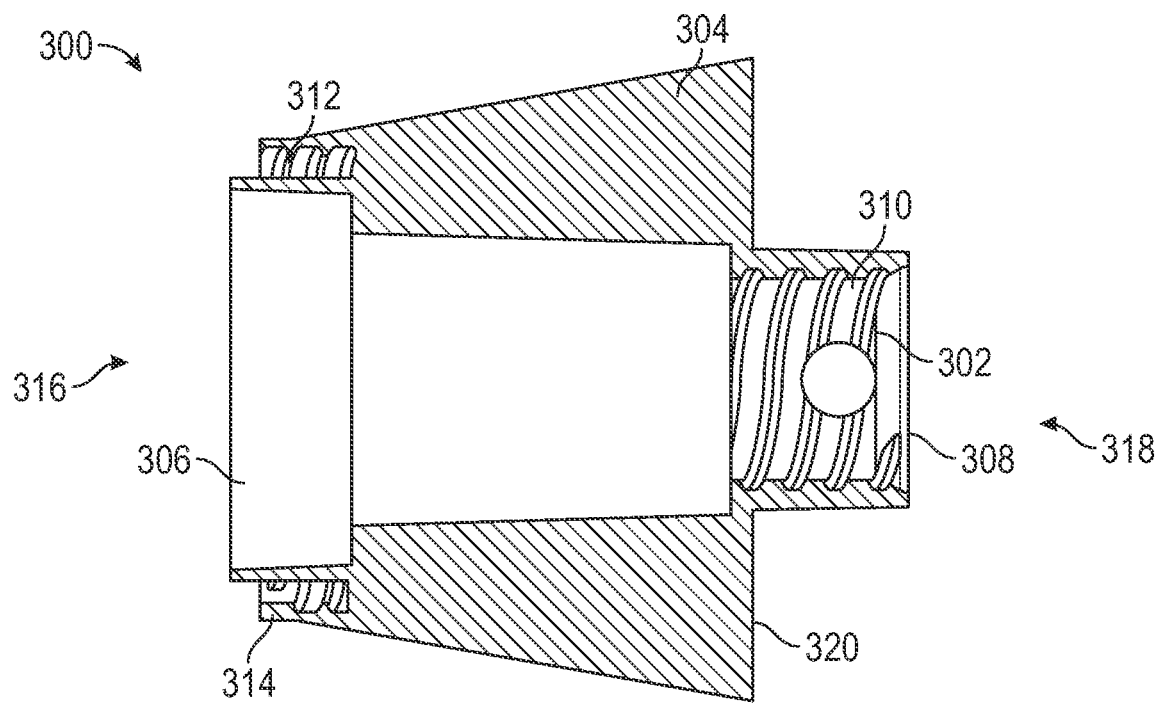
FIG. 3B depicts a cross-sectional view of the exemplary pocket-former of FIG. 3A.
Figure 3C:
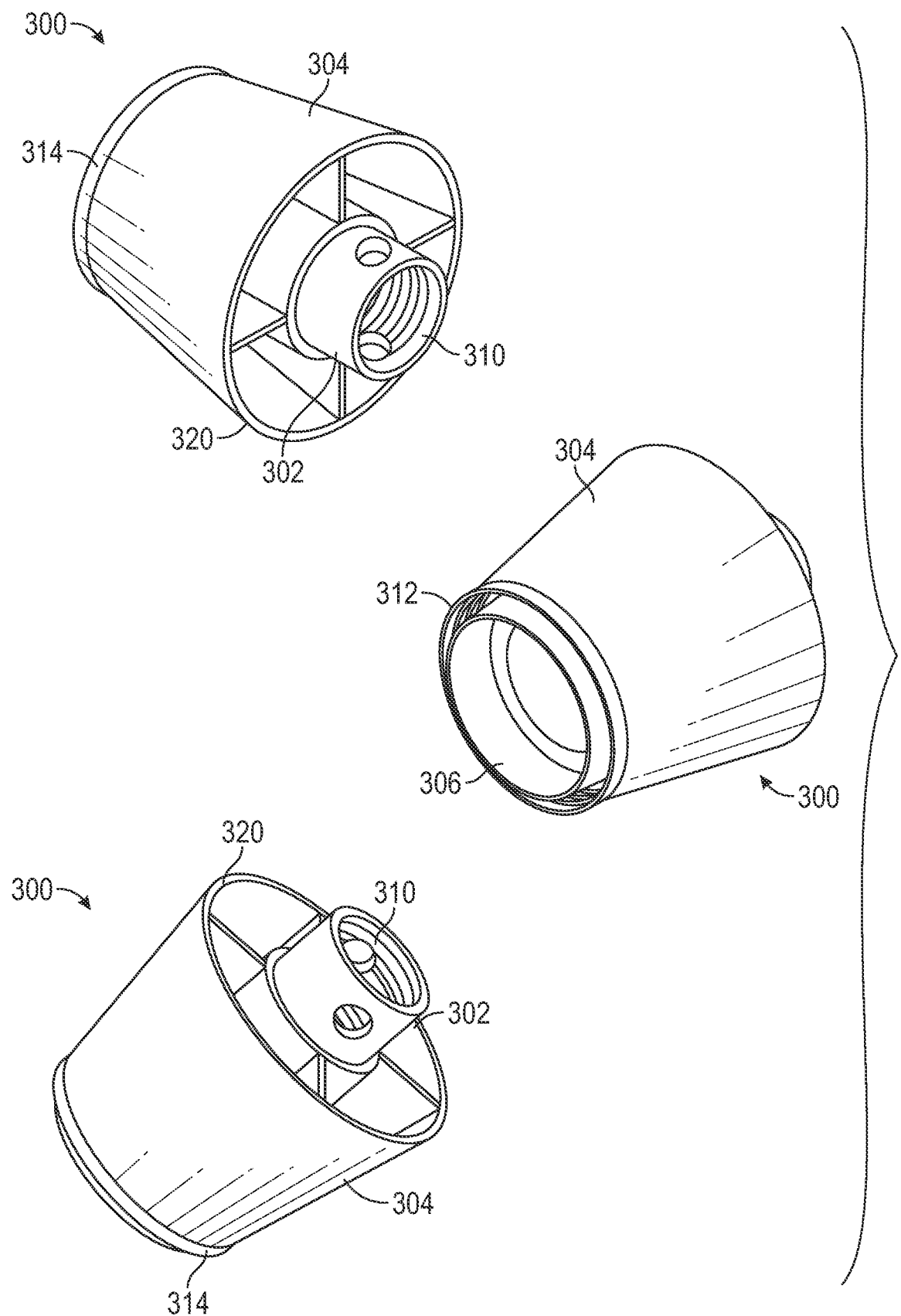
FIG. 3C depicts a number of perspective views of the exemplary pocket-former of FIG. 3A.

FIGS. 3A-3C depict another embodiment of the present disclosure. In one embodiment, a pocket-former (pocket-former member) 300 can include a first end 316 and a second end 318. In another embodiment, the pocket-former 300 can be of any shape, size, or design suitable to create a pocket around an anchor when a slurry is poured; preferably, the pocket created by the pocket-former 300 can be large enough to accommodate a shearing device known in the art, such as the disclosure of U.S. App. No. 63/094,429, which is herein incorporated by reference as an example. In another embodiment, a pocket-former 300 can be a pocket-former known in the art, such as can be seen in U.S. Pat. No. 8,069,624, which is herein incorporate by reference in its entirety. For example, a pocket-former 300 can include an inner tube 302 and an outer tube 304. The inner tube 302 can include a first end 306 and a second end 308, and the outer tube 304 can include a first end 314 and a second end 320; in one embodiment, the outer tube 304 can be frustoconical. In one embodiment, the outer tube 304 can be connected to the inner tube 302 as is known in the art; in another embodiment, the outer tube 304 can be connect to the inner tube 302 via brackets, gussets, connectors, welding, or any other way suitable to secure the outer tube 304 to the inner tube 302. In another embodiment, the pocket-former 300 can take the form of a single tube or bulbous shape, tapered or not, frustoconical or not, that can engage an anchor and form a pocket when a slurry is applied. As seen in FIG. 3B, which is a cross-sectional view of the pocket-former 300 depicted in FIG. 3A, the first end 316 of the pocket-former 300 can include a first coupling mechanism 312, such as threads 312; in one embodiment, the first coupling mechanism 312 can be a second part of a coupling mechanism 312 that can correspond to the first part of a coupling mechanism on, for example, an anchor like that discussed with respect to FIGS. 2A-2C. The second end 318 can include a second coupling mechanism 310. The first and second coupling mechanisms 312, 310 can be threads, a latch, a lip, a seal, a clamp, a quick-connect, or any other type of mechanism suitable to couple the pocket-former 300 to a corresponding component. Preferably, the first coupling mechanism 312 can be configured to couple the pocket-former 300 to an anchor, and the second coupling mechanism 310 can be configured to couple the pocket-former 300 to a bolt or form (not shown in FIGS. 3A-3C), such as via a corresponding bolt (not shown in FIGS. 3A-3C). In one embodiment, the first coupling mechanism 312 can include internal threads 312 configured to receive external threads, such as collar threads 204 depicted in FIGS. 2A-2C. In another embodiment, the second coupling mechanism 310 can include internal threads 310 configured to receive external threads, such as the threads 402 depicted in FIGS. 4A-4C.

In one embodiment, the first end 306 and second end 308 of the inner tube 302 can each extend beyond the first end 314 and second end 320 of the outer tube 304, respectively. The first end 306 of the inner tube 302 can, in this manner, form a lip protruding from within the outer tube 304, as seen in FIG. 3A. In one embodiment, the first end 306 of the inner tube 302 can extend into a collar 210 of an anchor 200 like that depicted in FIGS. 2A-2C, and the coupling mechanism (threads) 312 on the interior of the first end 314 of the outer tube 304 can engage with the collar threads 204 of the anchor 200. Such coupling can be seen, for example, in FIG. 1B, wherein the anchor 102 can coupled to the pocket-former 104. In this manner, the pocket-former 300 and anchor can be engaged with one another such that the connection can be impermeable to liquids or slurries, such as to protect the tendon and inside of the anchor from concrete that could interfere with tensioning. In another embodiment, the second end 308 of the inner tube 302 can extend from within the outer tube 304 such that the second end 308 can protrude into, for example, a hole in a form, such as the form 108 seen in FIGS. 1A-1C. Such extension of the second end 308 of the inner tube 302 can enable the second end 320 of the outer tube 320 to abut a form, bracing the pocket-former 300 against the form, while the inner tube 302 can extend into a hole in the form to engage with a bolt (not shown in FIGS. 3A-3C). An example of this extension and placement can be seen in FIG. 1B, wherein the pocket-former 104 can be installed against a form board 108 and secure an anchor 102 thereto via interaction with a bolt 106. The pocket-former 300 can be formed of polymer, plastic, metal, or any other materials suitable to form a pocket when a slurry is applied and secure an anchor to a form.

Figure 4A:
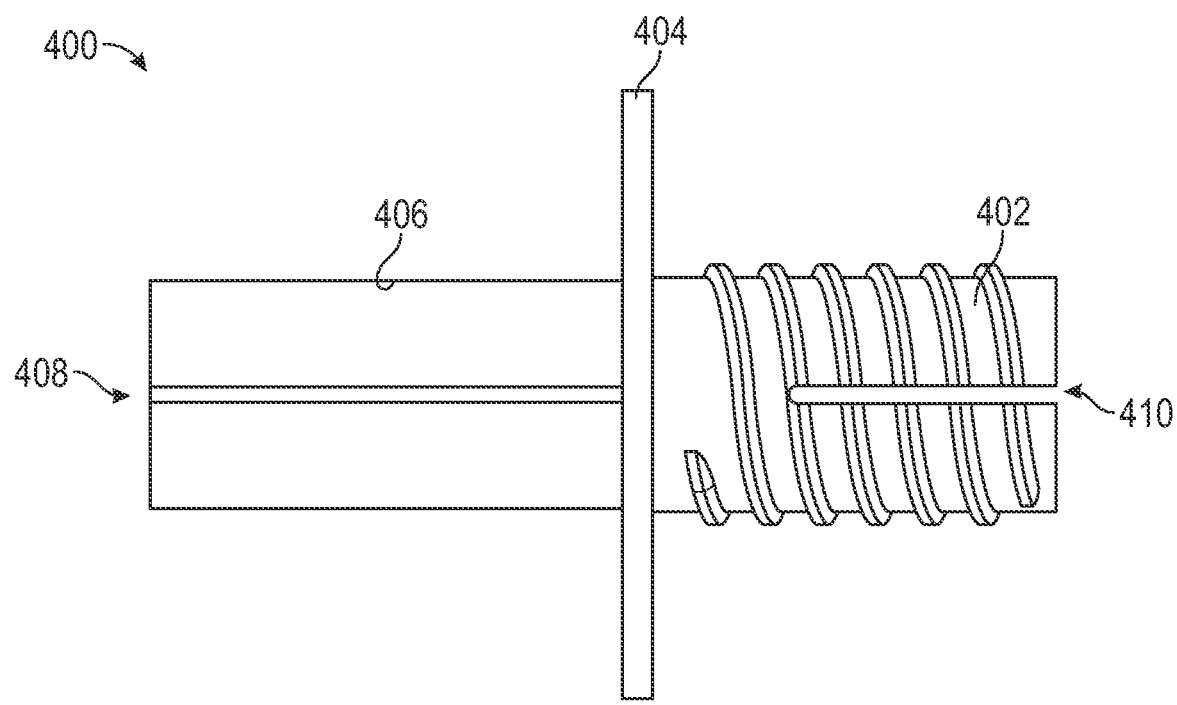
FIG. 4A shows a perspective view of an exemplary bolt or bolt member comprising a first end, second end, and flange in accordance with the principles of the present disclosure.
Figure 4B:
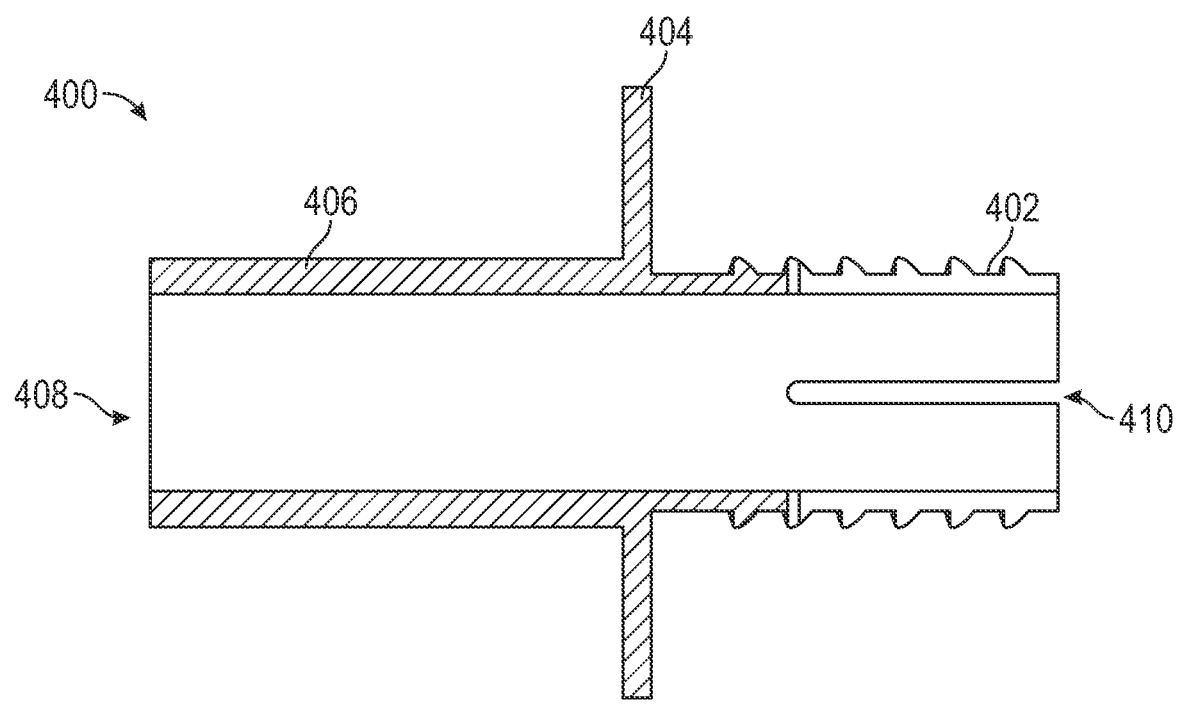
FIG. 4B shows a cross-sectional view of the exemplary bolt of FIG. 4A.
Figure 4C:
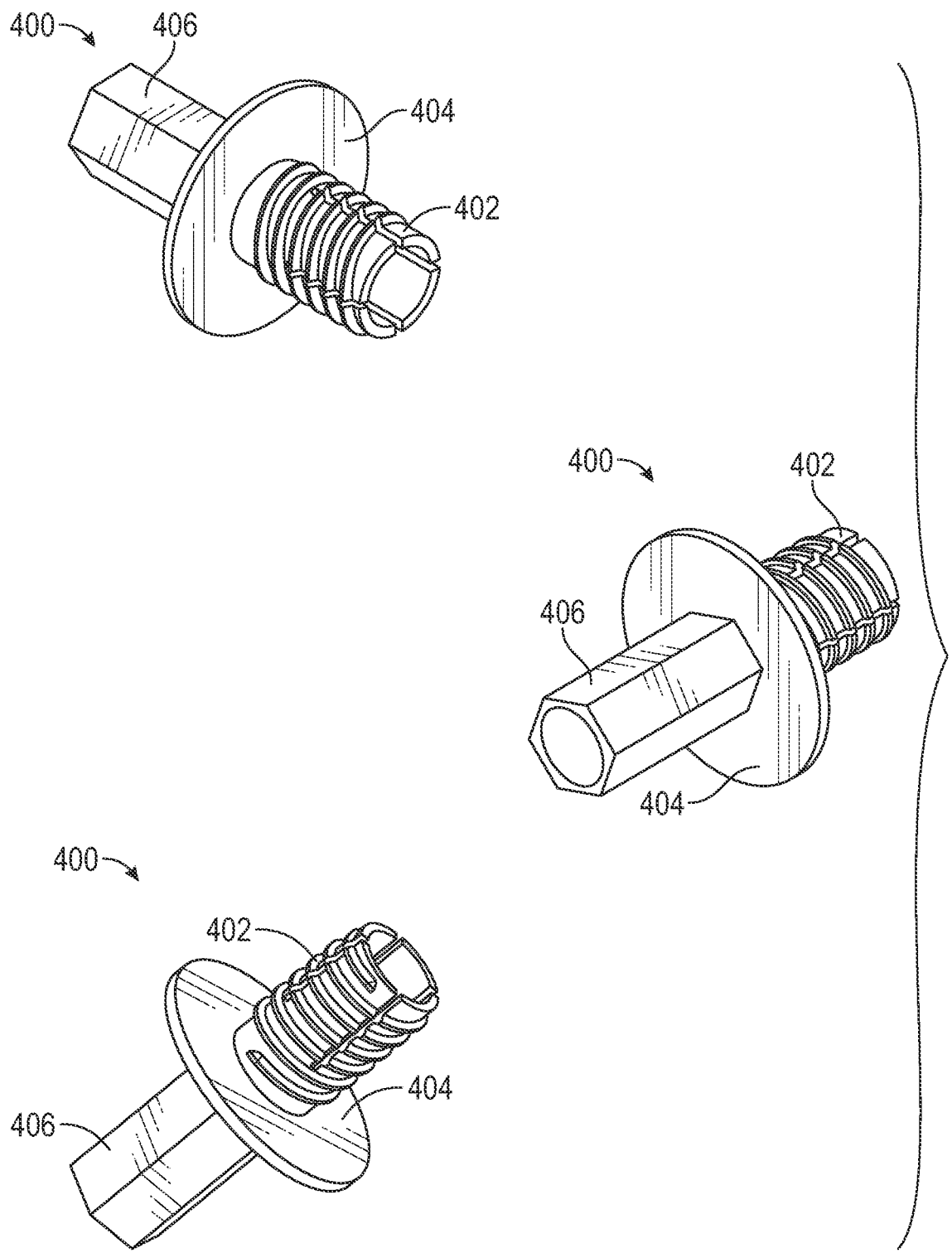
FIG. 4C shows a number of perspective views of the exemplary bolt of FIG. 4A.

FIGS. 4A-4C depict another embodiment of the present disclosure. In one embodiment, a bolt (bolt member) 400 can comprise a first end 408 and a second end 410. For example, the bolt member 400 can take a form of a tube with a first end 408 and a second end 410, with a flange 404 disposed therebetween. In another embodiment, either the first or second end 408, 410 can comprise a coupling mechanism 402. The coupling mechanism 402 can include threads, a lip, a latch, a seal, a clamp, a quick-connect, or any other type of mechanism suitable to couple the bolt 400 to a corresponding component. Preferably, the coupling mechanism 402 can be threads 402. For example, threads 402 can correspond to threads of a pocket-former, such as the pocket-former 300 depicted in FIGS. 3A-3C. In another embodiment, a bolt 400 can comprise a flange 404 or washer 404. The flange 404 can enable the bolt 400 to exert force on a form, such as around a hole in a form through which the second end 410 of the bolt 400 extends, as the second end 410 of the bolt 410 engages, for example, an end of a pocket-former, such as the second end 308 of the inner tube 302 depicted in FIGS. 3A-3C. In one embodiment, the bolt 400 can be hollow, such as to receive a tail of a tendon. In another embodiment, the bolt 400 can comprise a head 406 and a connector 402. The head 406 can include a hilt, shaft, nut, cap, ring, or any other component suitable to facilitate the application of torque to the bolt 400. The head 406 can be of any suitable size or shape to allow the bolt 400 to be tightened by hand, or otherwise engage with a tool; for example, the head 406 can be configured as any standard wrench head. In one embodiment, the head 406 can be an extended hexagonal tube, such as to allow the engaging of a wrench or a human hand with the head 406 to tighten the bolt 400. In one embodiment, the head 406 can be enclosed, such that, for example, a tail of a tendon cannot extend beyond the head 406; in another embodiment, the head 406 can be open, such as to allow a tendon tail to extend therethrough. In one embodiment, the head 406 or first end 408 can take the form of a tube 406, such that a tail of a tendon can extend therethrough. In one embodiment, the connector 402 can include threads, a latch, a lip, a seal, a clamp, a quick-connect, or any other type of mechanism suitable to couple the bolt 400 to a corresponding component; in another embodiment, the connector 402 can include threads 402, such as threads that can correspond to threads in, for example, an end of a pocket-former such as a pocket-former discussed herein. In another embodiment, the connector 402 can be hollow, such as to allow a tendon to extend therethrough. The bolt 400 can be formed of polymer, plastic, metal, or any other materials suitable to secure a pocket-former and/or an anchor to a form.

Figure 5A:
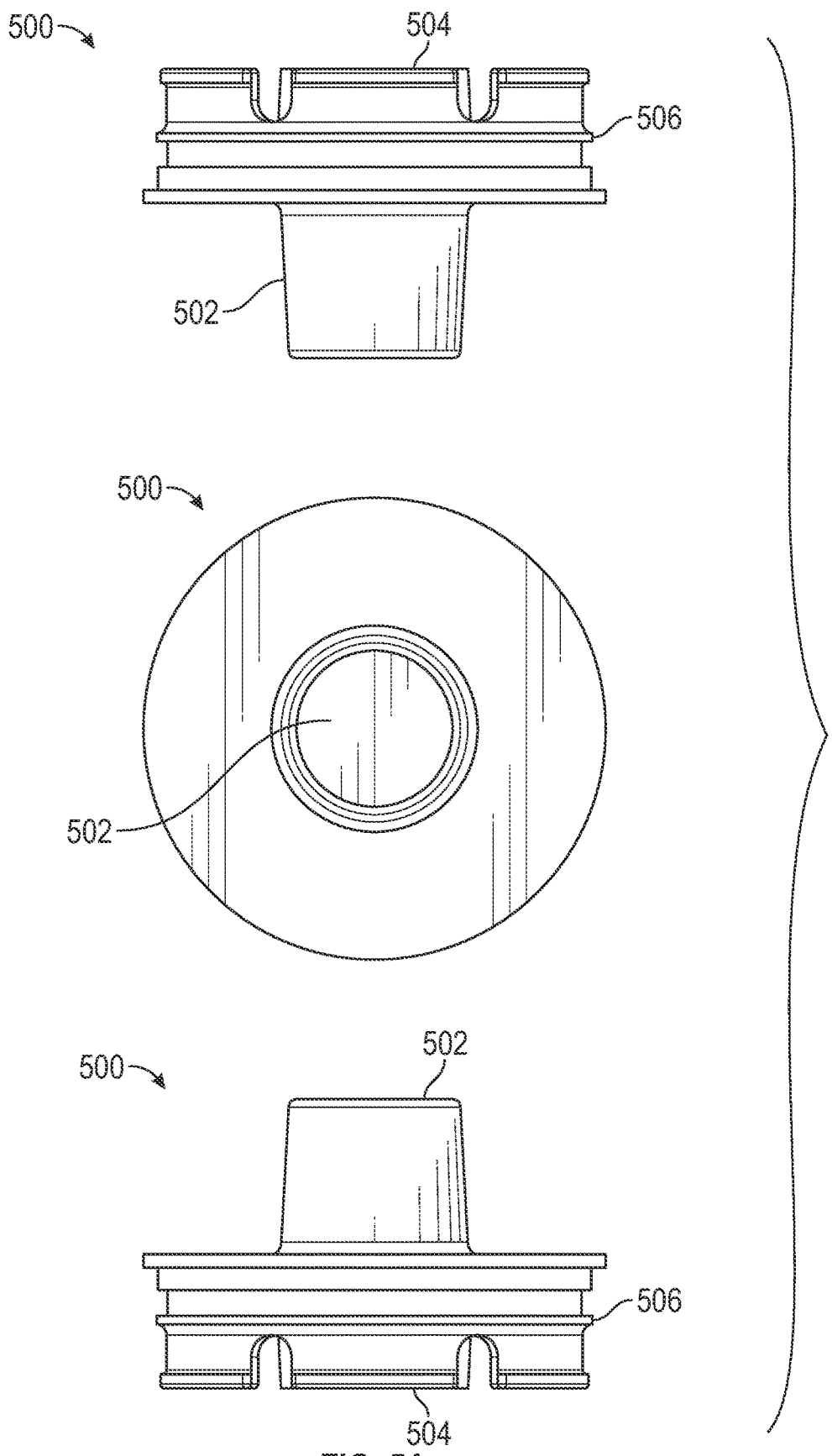
FIG. 5A shows a number of perspective views of an exemplary cap or cap member comprising a top side, bottom side, and a sealer member in accordance with the principles of the present disclosure.
Figure 5B:
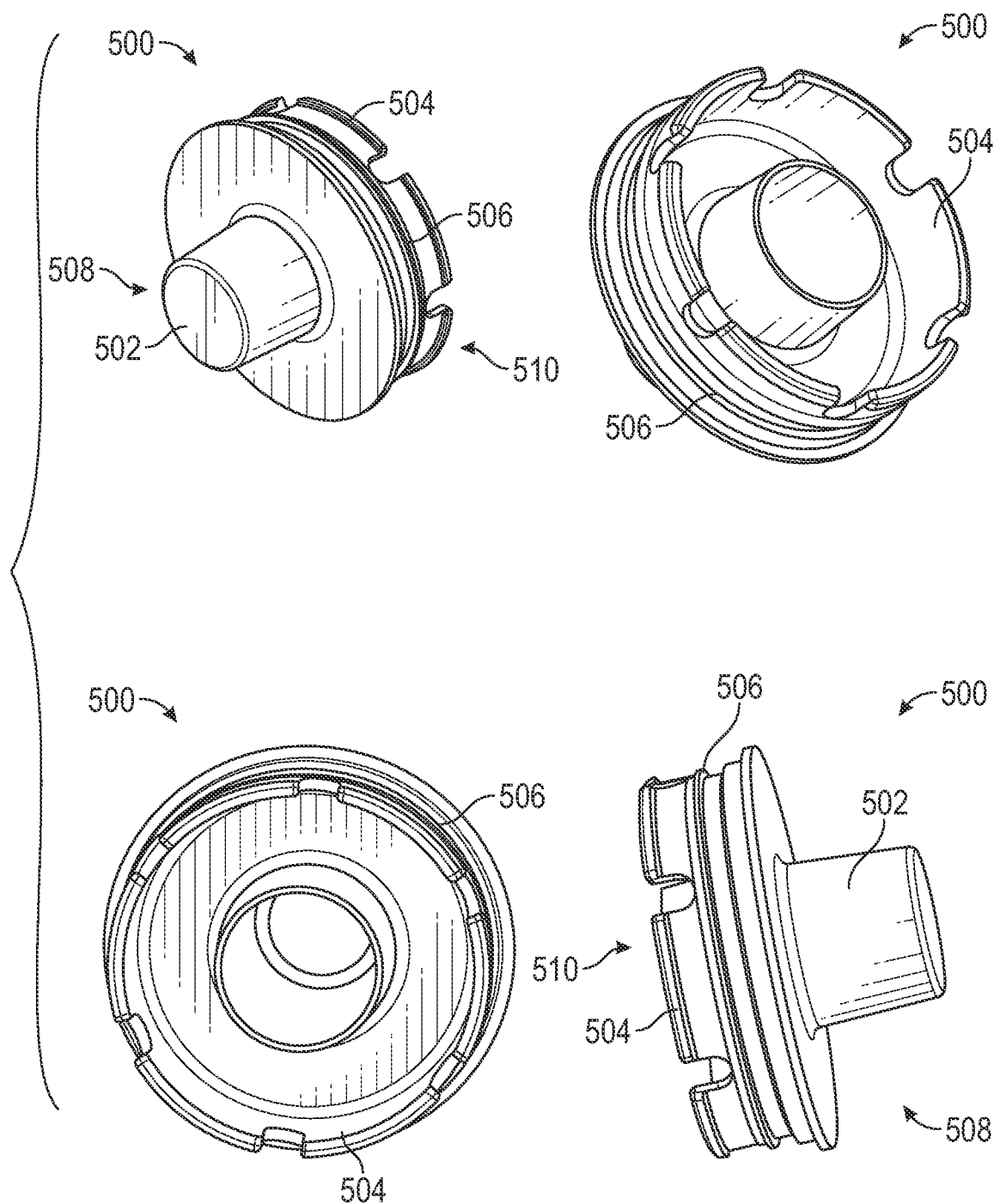
FIG. 5B shows a number of perspective views of an exemplary cap or cap member comprising a top side, bottom side, and a sealer member in accordance with the principles of the present disclosure.

FIGS. 5A-5B depict another embodiment of the present disclosure. A cap (cap member) 500 can include a top side 508 and a bottom side 510. In one embodiment, the top side 508 can include a nodule 502 that protrudes from the top side 508. The nodule 502 can be of any length, depth, or size to enable the cap 500 to be gripped; in another embodiment, the nodule 502 can be of any length, depth, or size to receive a tail of a tendon, such as a tail of a tendon that has been sheared. In one embodiment, the bottom side 510 can include a rim 504; in another embodiment, the rim 504 can include arches or other pores to, for example, allow air to escape as the cap 500 is engaged with, for example, an anchor collar, or to facilitate the capping of an anchor. In another embodiment, the cap 500 can include a sealing member 506. For example, the sealing member 506 can include an O-ring 506; in another example, the sealing member 506 can comprise wax, adhesive, plastic, rubber, or any other component or material suitable to create a seal between the cap member 500 and the component it is capping. For example, the cap member 500 can include an O-ring 506 that can create a seal between the cap 500 and a collar of an anchor, such as the collar 210 of the anchor 200 depicted in FIGS. 1A-1C.

Figure 6:
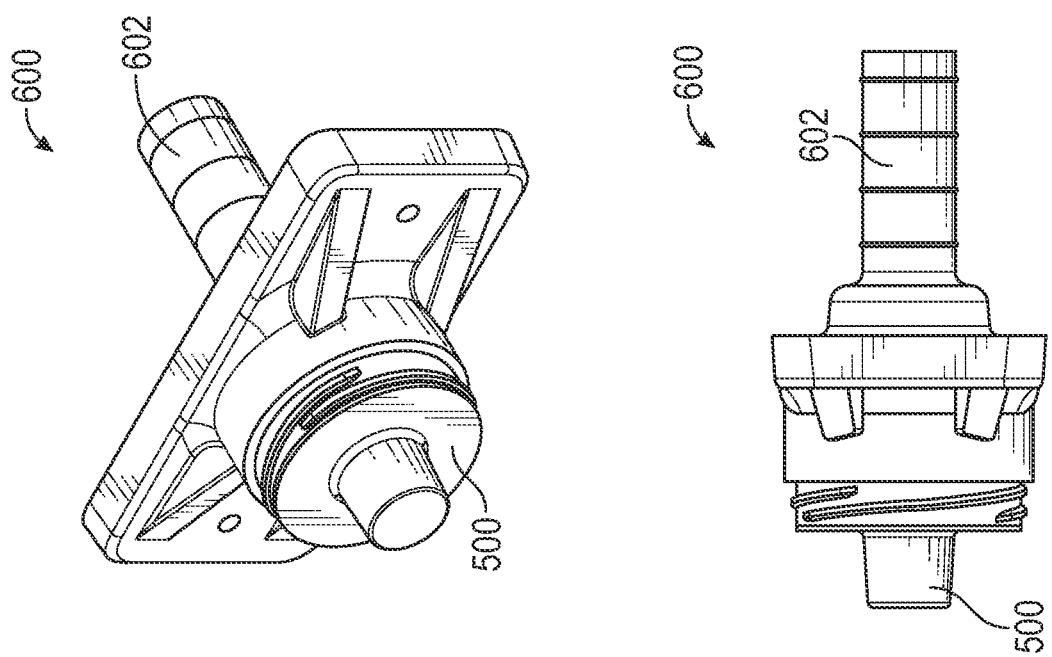
FIG. 6 depicts a number of perspective views of an exemplary post-tensioning system in accordance with the principles of the present disclosure, wherein the system can comprise an anchor and a cap coupled to the anchor.
Figure 6:
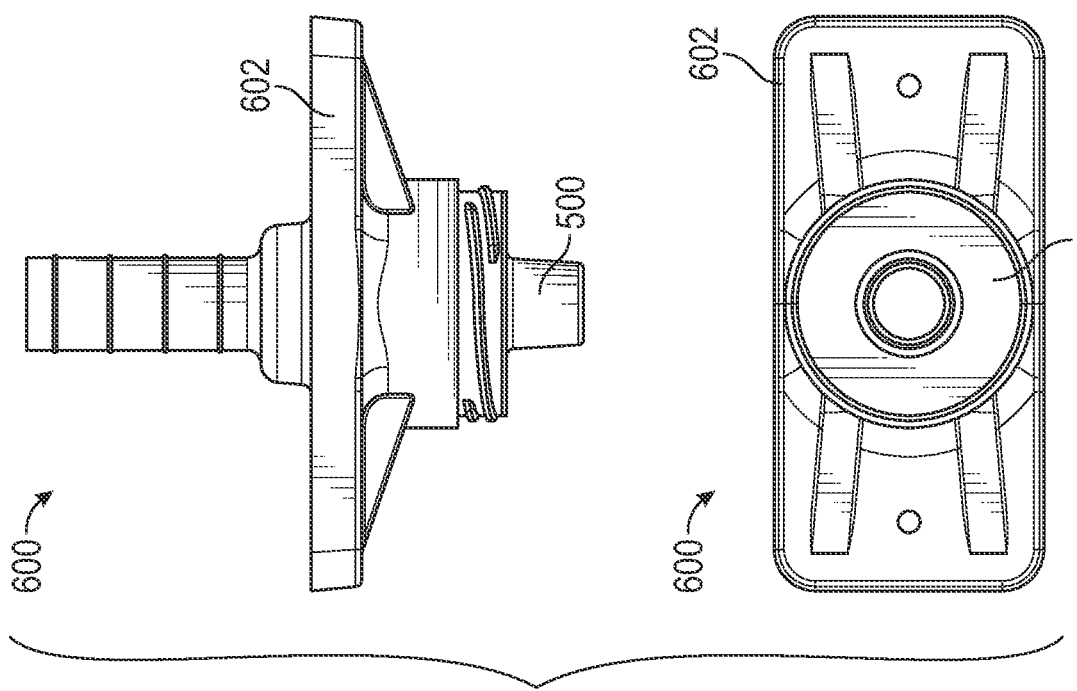
Figure 7A:
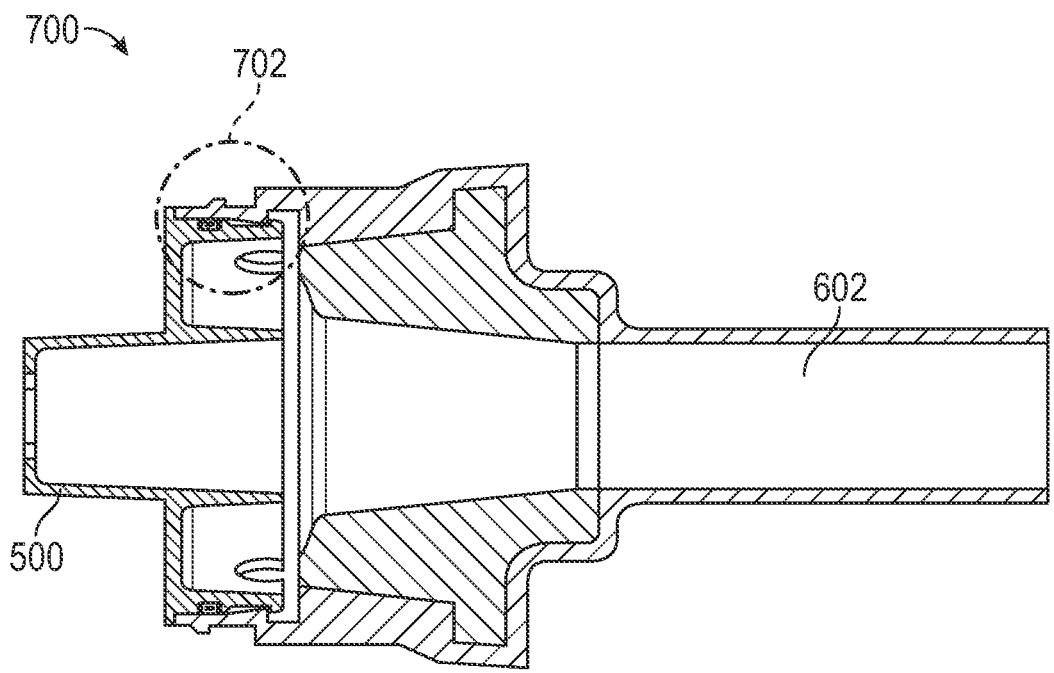
FIG. 7A depicts a cross-section view of an exemplary post-tensioning system similar to the post-tensioning system of FIG. 6.
Figure 7B:
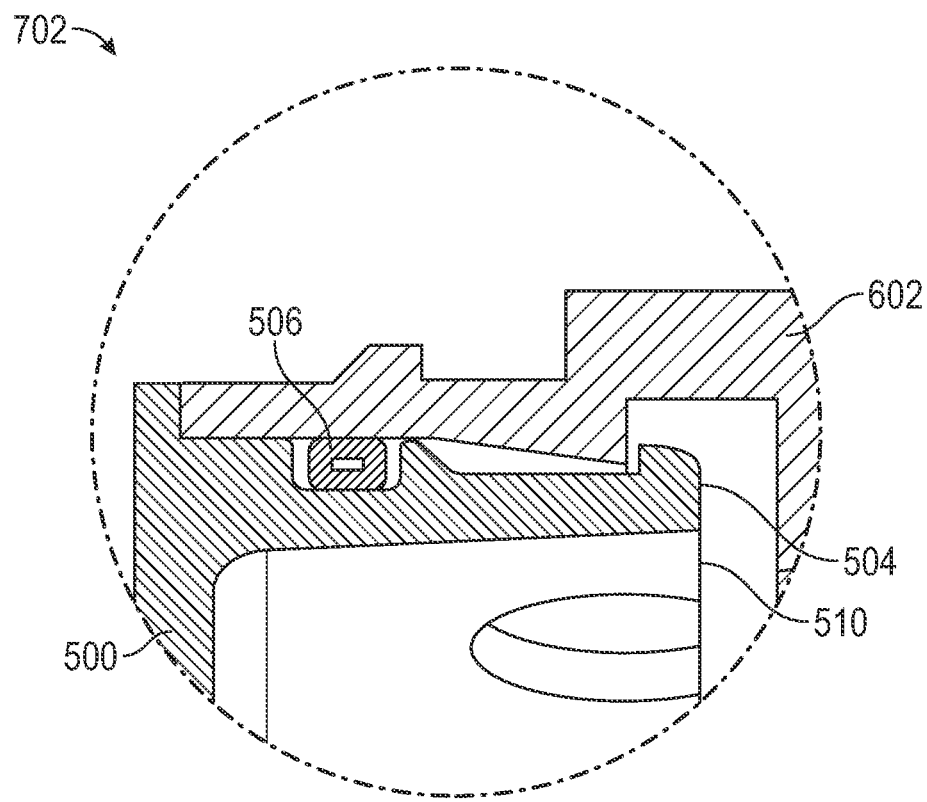
FIG. 7B depicts the exemplary post-tensioning system of FIG. 7A, wherein a seal is depicted between a cap and an anchor that can be facilitated by the sealer member.

FIG. 6 depicts another embodiment of the present disclosure. A post-tensioning system 600 can include an anchor (anchor member) 602 and a cap (cap member) 500 as depicted in FIGS. 5A-5B. The cap 500 can be used to enclose a sheared tendon within an anchor after tensioning as occurred. For example, when a slab has been tensioned, the tendon tail can be cleaved within the pocket formed by a pocket-former. The tendon end, and the inside of the anchor 602, can then be exposed to the elements, which can lead to corrosion of the tendon and the anchor 602. To mitigate or prevent corrosion, a cap 500 can be engaged with the anchor 602, effectively protecting the tendon tail and inside of the anchor from such corrosion. The cap 500 can be made from plastic, polymer, glass, metal, or any other material suitable to cap an anchor and mitigate or prevent corrosion of the system 600. For example, FIGS. 7A-7B depict another embodiment of the present disclosure, wherein a post-tensioning system 700 includes a cap 500 and an anchor 602. The cap 500 can create a seal with the anchor 602, such as at the area depicted at 702. For example, the sealing member 506 can be an O-ring 506 that can create a seal with the anchor 602, while the bottom side 510 (and/or the rim 504) can facilitate securing of the cap 500 within the anchor, such as via a lip of the rim 504 engaging the anchor 602 as seen in FIG. 7B.

Figure 8A:
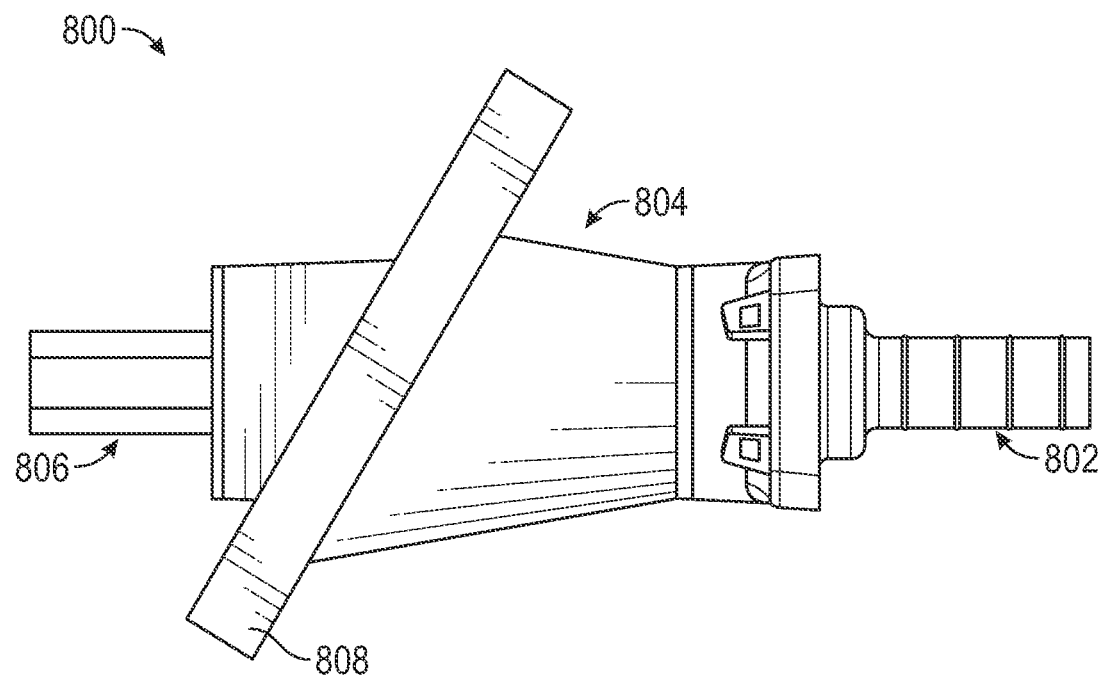
FIG. 8A shows an exemplary post-tensioning system in accordance with the principles of the present disclosure, wherein the system can comprise an anchor, a pocket-former, a bolt, a washer, and can be further configured to be secured to a form, for example, to an angled form.
Figure 8B:
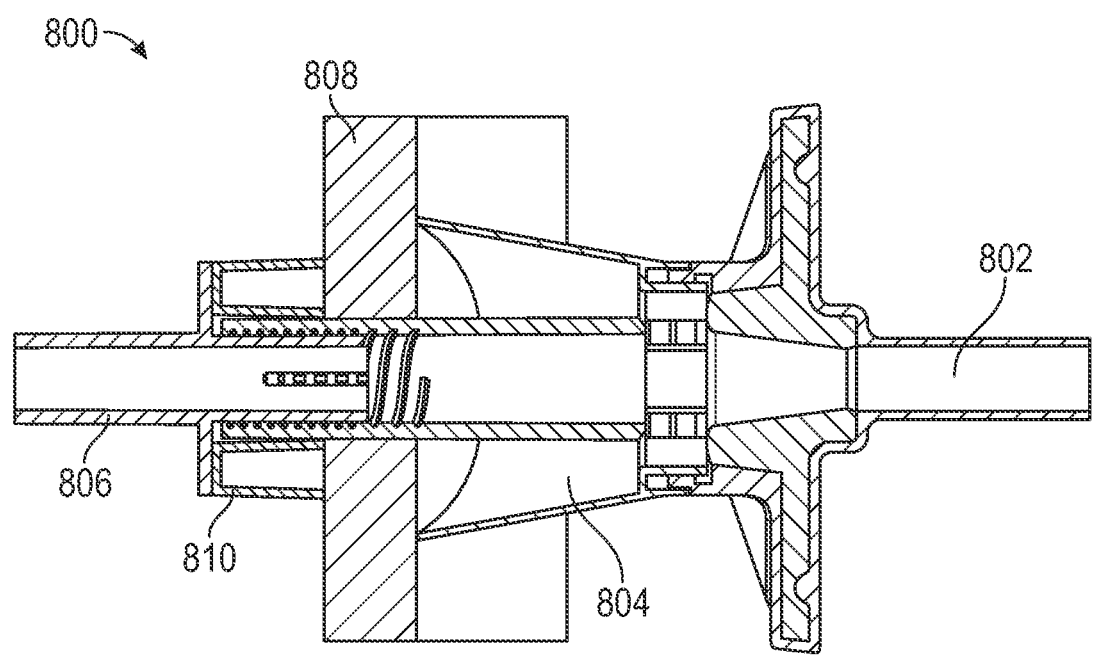
FIG. 8B shows a cross-sectional view of the exemplary post-tensioning system of FIG. 8A.
Figure 8C:
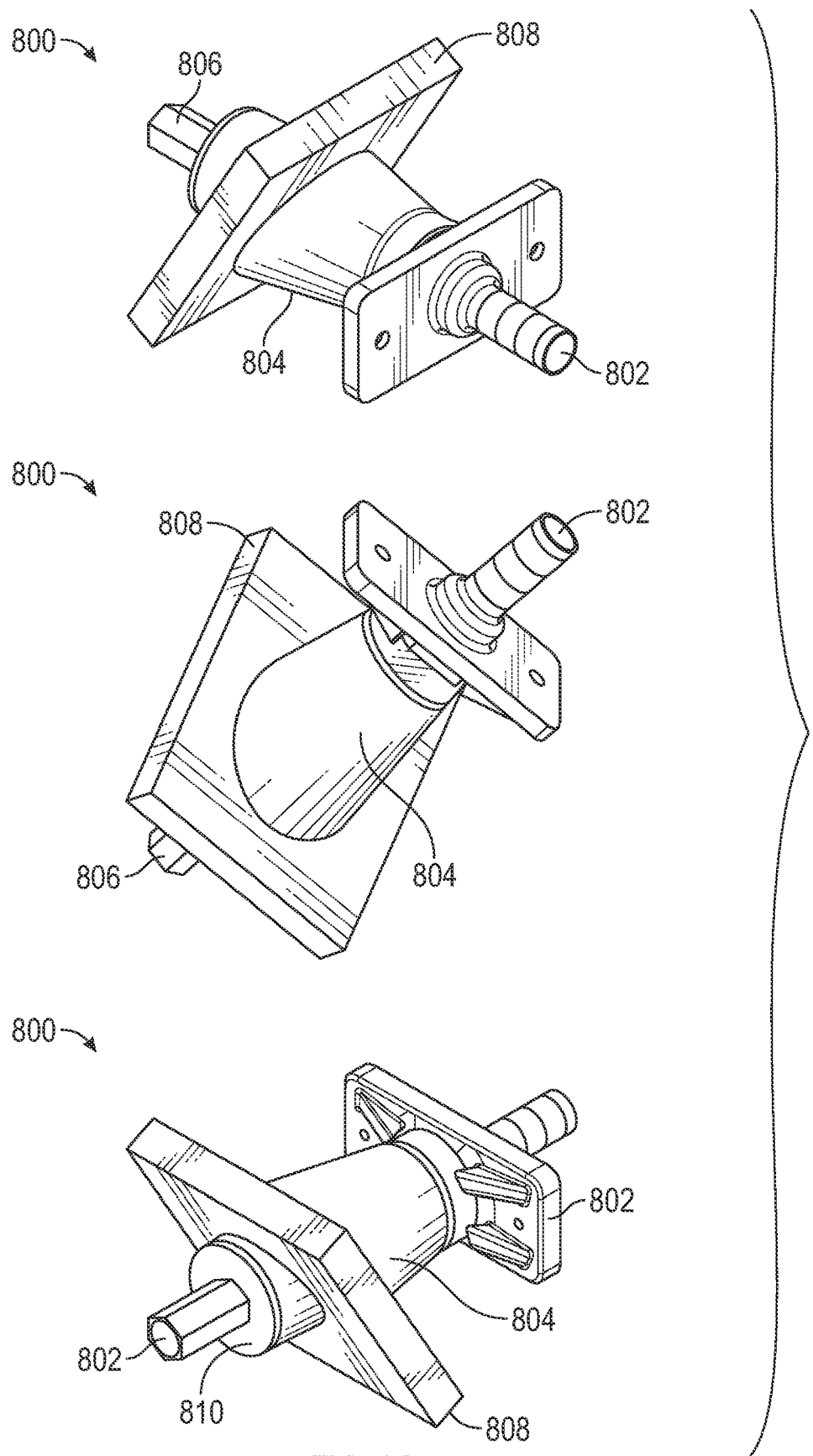
FIG. 8C depicts a number of perspective views of the exemplary post-tensioning system of FIG. 8A.

FIGS. 8A-8C depict another embodiment of the present disclosure. A pocket-former apparatus 800 or post-tensioning system 800 can be similar to the system and apparatus of FIGS. 1A-1C and can be configured to accommodate and tension a slab, for example, a slab at an angle. For example, a form 808 can provide shape to a slab, and a pocket-former 804 can be configured to be seated against the form 808, such as via an angle of an outer tube of the pocket-former 804. Similarly, the bolt member 806 can be configured to be seated against the form 808; for example, a flange 810 or washer 810 of the bolt member 806 can be angled to correspond to the angle of the form 808.

Figure 9A:
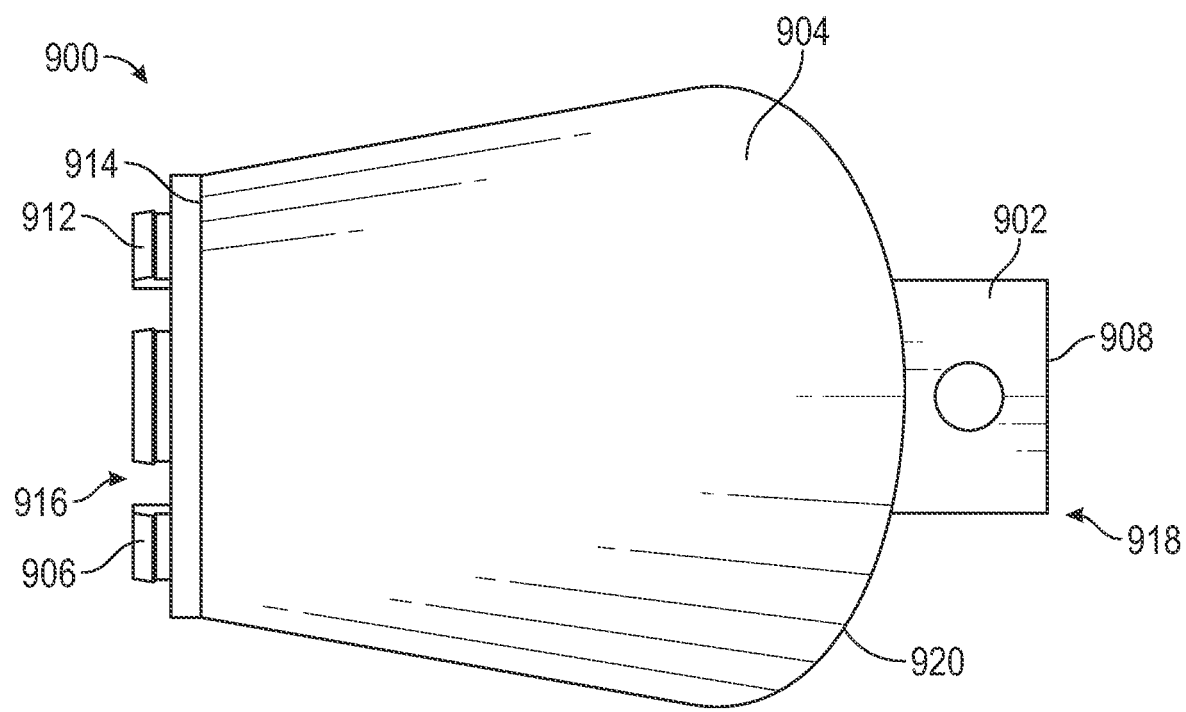
FIG. 9A depicts an exemplary pocket-former comprising a first end, second end, and at least one coupling mechanism in accordance with the principles of the present disclosure.
Figure 9B:
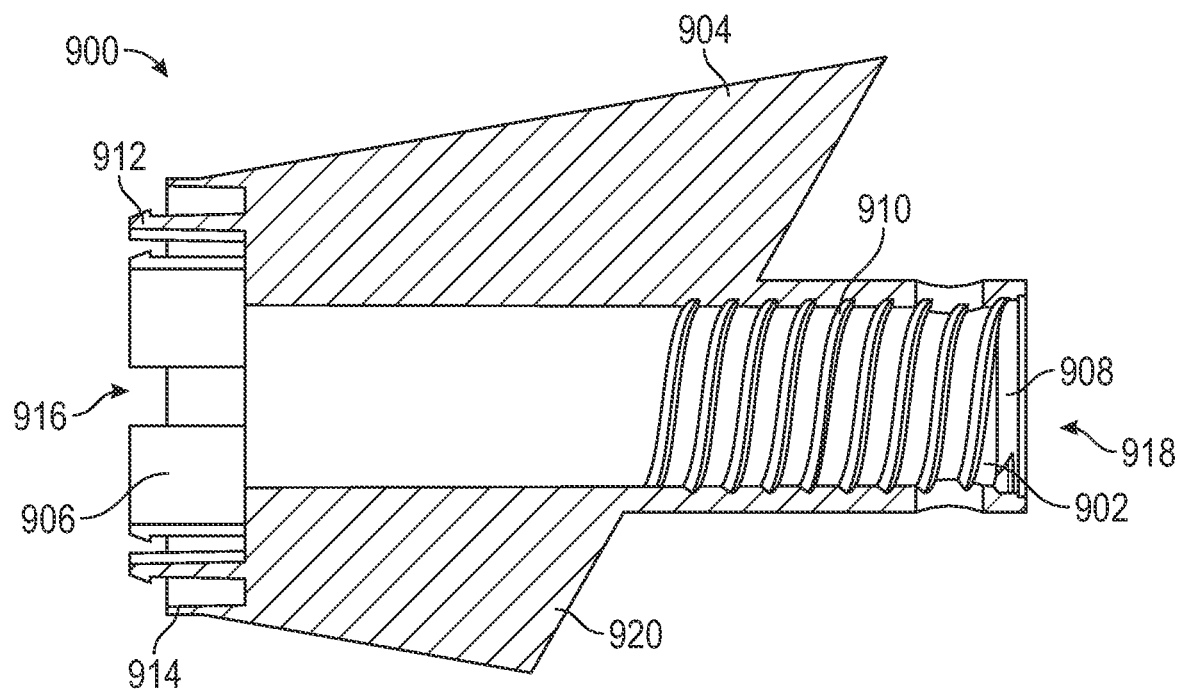
FIG. 9B depicts a cross-sectional view of the exemplary pocket-former of FIG. 9A.
Figure 9C:
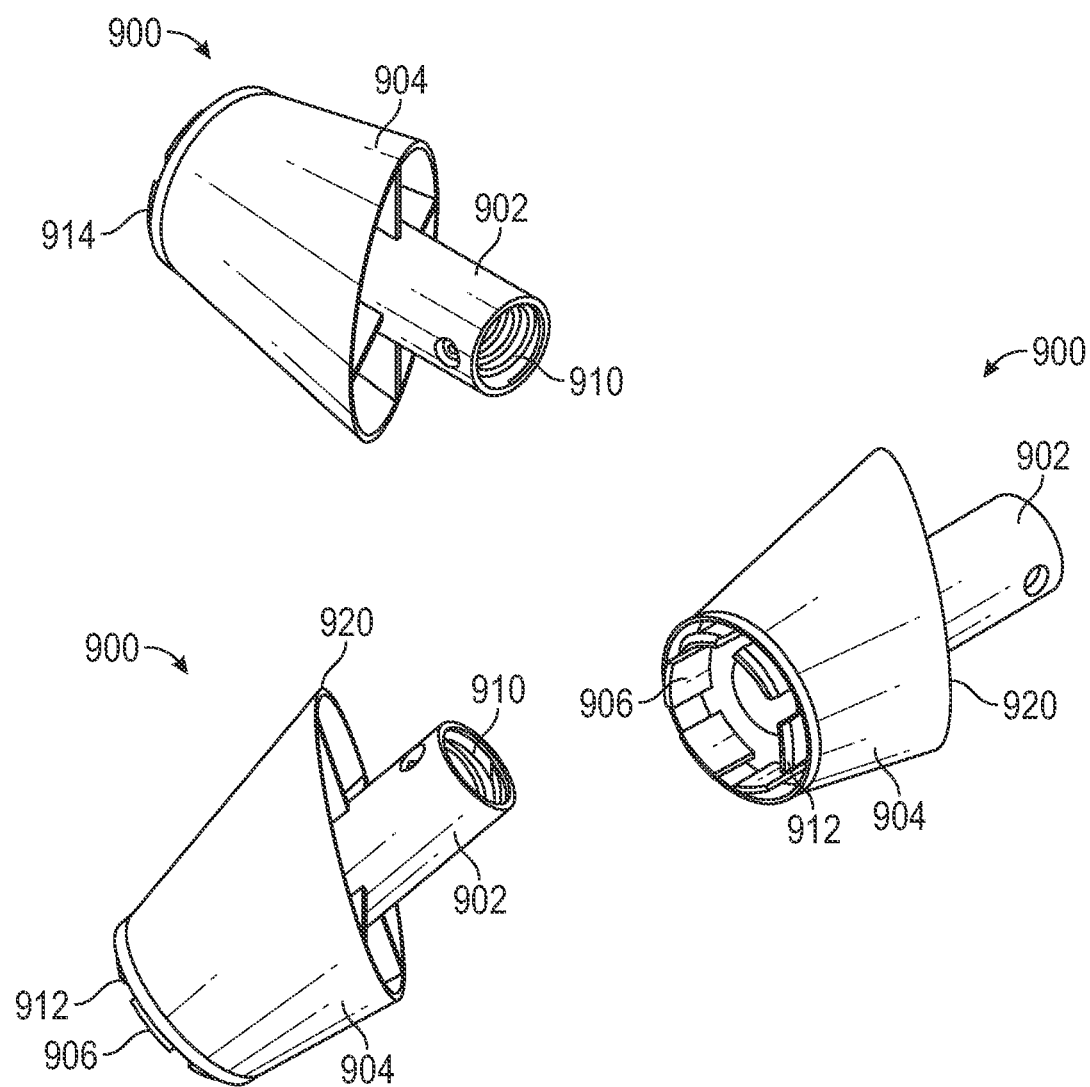
FIG. 9C depicts a number of perspective views of the exemplary pocket-former of FIG. 9A.

FIGS. 9A-9C depict another embodiment of the present disclosure. A pocket-former (pocket-former member) 900 can be similar to the pocket-former 300 of FIGS. 3A-3C. The pocket-former 900 can include a first end 916 and a second end 918, and can be of any suitable size, shape, or design to enable the pocket-former 900 to engage an anchor and form a pocket when a slurry is applied. In one embodiment, the first end 915 of the pocket-former 900 can include a first coupling mechanism 312; in another embodiment, the second end 918 of the pocket-former 900 can include a second coupling mechanism 910. The first and second coupling mechanisms 912, 910 can comprise threads, a latch, a lip, a seal, a clamp, a quick-connect, or any other type of mechanism suitable to couple the pocket-former 900 to a corresponding component. Preferably, the first coupling mechanism 912 can be configured to engage with and couple the pocket-former 900 to an anchor, such as an anchor discussed herein. For example, the first coupling mechanism 912 can include a rim 912 sized to fit, for example, within a collar of an anchor. The rim 912 can further comprise a beveled lip 912 configured to allow one-way insertion into the collar, such that the beveling enables the rim 912 to insert into the collar while hindering the removal of the rim 912 from within the collar. In this manner, the first end 916 of the pocket-former 900 can be configured to couple with or engage with a collar of an anchor. Preferably, the second coupling mechanism 910 can be configured to couple or engage with a bolt or bolt member, such as those discussed herein. For example, the second coupling mechanism 910 can include threads 910 configured to engage with corresponding threads on a bolt member, such as the threads 402 discussed with respect to the bolt 400 depicted in FIGS. 4A-4C.

In one embodiment, a pocket-former 900 can include an inner tube 902 and an outer tube 904. The inner tube 902 can include a first end 906 and a second end 908, and the outer tube can include a first end 914 and a second end 920. In one embodiment, the first 914 or second end 920 of the outer tube 904 can be angled, such as to conform to an angled form such as can be seen in FIGS. 8A-8C. In another embodiment, the first end 906 or second 908 end (or both) of the inner tube 902 can extend beyond the first 914 and/or second 920 end of the outer tube 904, respectively. In another embodiment, a first coupling mechanism 912 can be disposed or present on the first end 906 of the inner tube 902; for example, the first end 906 of the inner tube 902 can comprise a rim 912 with a beveled lip 912 such as that discussed above. Further, there can be a space between the first end 906 of the inner tube 902 and the first end 914 of the outer tube 904 can, such that at least a portion of a collar of an anchor can engage within the space; in this manner, for example, the first end 916 of the pocket-former 900 can be configured to engage with or couple with a collar of an anchor. In another embodiment, a second end 908 of the inner tube 902 can comprise a second coupling mechanism 910; for example, the second coupling mechanism 910 can include threads 910 on the inside of the inner tube 910 that can correspond to threads of, for example, a bolt of bolt member like those discussed herein. In this manner, for example, the second end 918 of the pocket-former 900 can be configured to engage or couple with a bolt or bolt member.

Figure 10A:
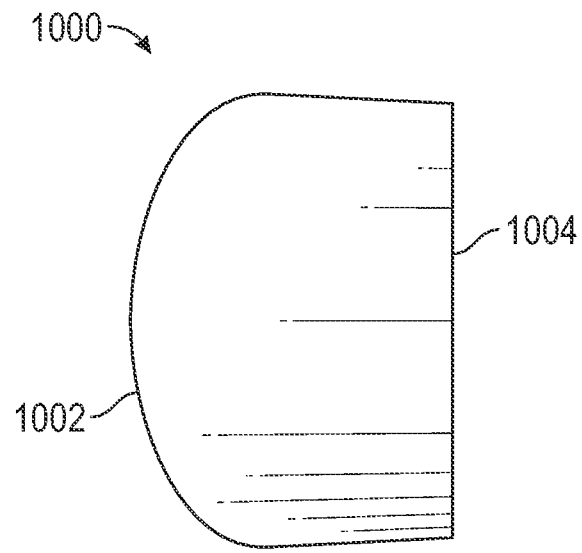
FIG. 10A depicts an exemplary washer comprising a first and second end in accordance with the principles of the present disclosure.
Figure 10B:
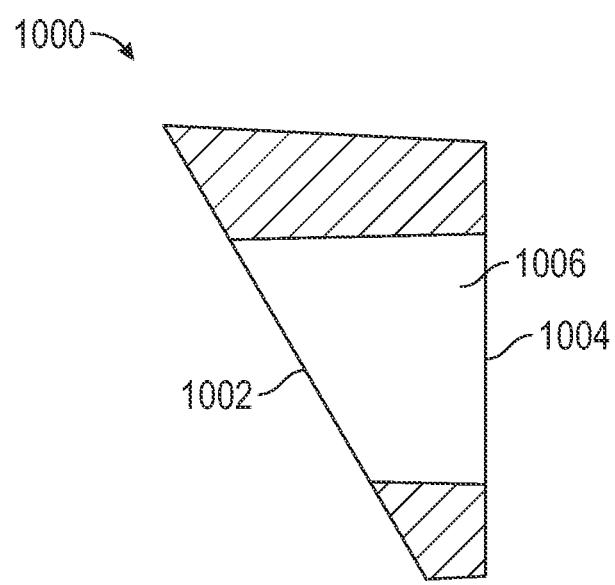
FIG. 10B depicts a cross-sectional view of the exemplary washer of FIG. 10A.
Figure 10C:
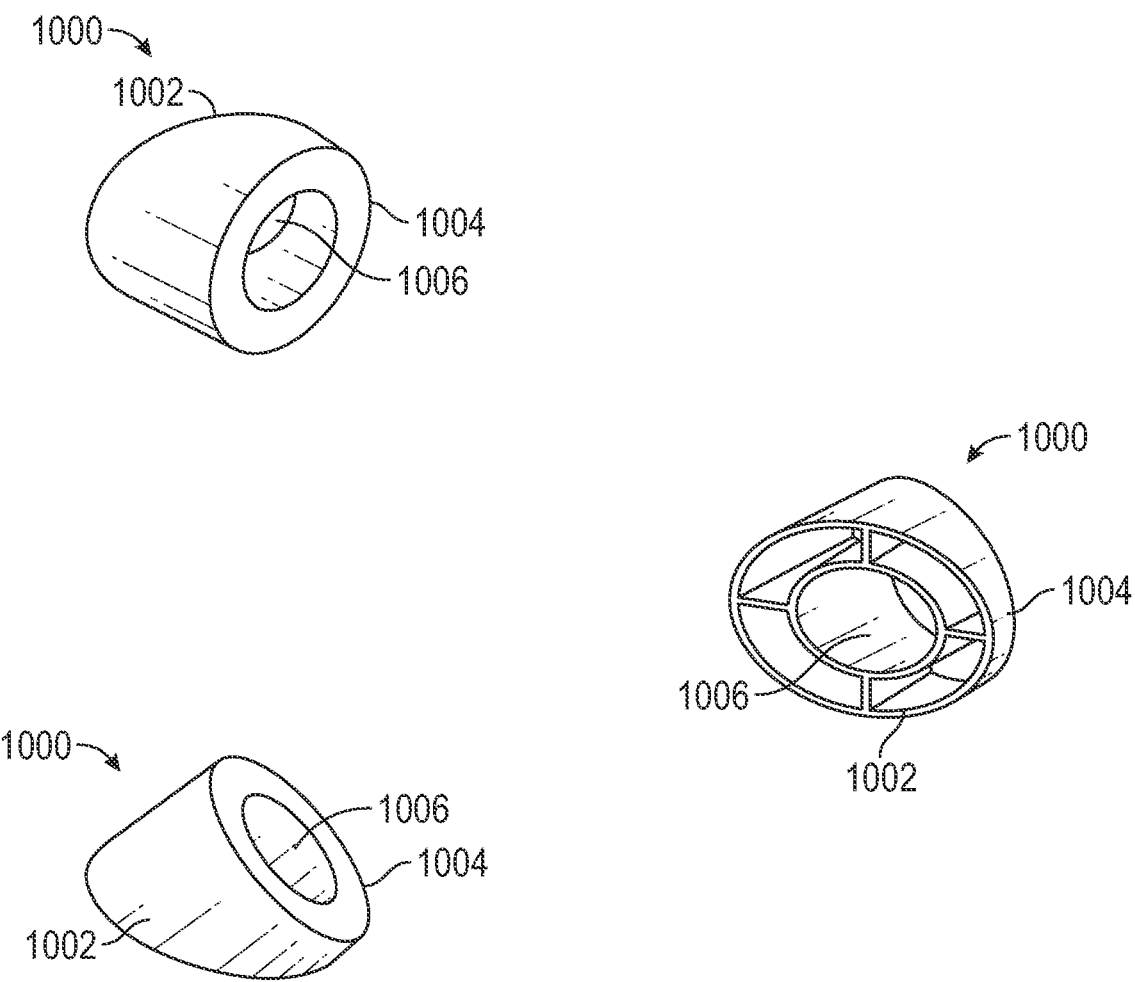
FIG. 10C depicts a number of perspective view of the exemplary washer of FIG. 10A.

FIGS. 10A-10C depict another embodiment of the present disclosure. A washer (washer member) 1000 can include a first side 1002 and a second side 1004. The washer 1000 can comprise a ring configured to engage or encircle a bolt or bolt member like those discussed herein, such as the washer 810 that can be seen in FIGS. 8A-8C. In one embodiment, the first side 1002 or the second side 1004 can be angled, such as the first side 1002 in FIG. 10B, such that the washer can abut an angled form board, such as washer 810 in FIGS. 8A-8C; in another embodiment, the sides 1002, 1004 can run parallel with one another, and the washer 1000 can be a flat circle or ring, such as to conform to a non-angled form. In one embodiment, the washer 810 can further comprise a cavity 1006 extending therethrough; in this manner, for example, the washer 810 can be configured to receive a bolt or bolt member, such as those discussed herein. Preferably, the washer 810 can be inserted over a bolt 806 and, for example, abut a flange of a bolt or restrict a bolt from traveling further through the cavity 1006, such that the bolt can then apply force at an angle commensurate with the form board angle, as seen in FIGS. 8A-8C. In another embodiment, a flange 810 can be disposed on a bolt, such as the bolt 400 depicted in FIGS. 4A-4C, such that the flange 404 can take the form of the flange 810.

FIGS. 11A-11B depict another embodiment of the present disclosure. A post tensioning system 1100 can include an anchor 1102 (which can be similar to anchor members 200, 602, etc. and be configured to couple to, for example, a pocket-former or cap), a strand 1104, and a cold shrink apparatus (cold shrink) (cold shrink member) 1106. The anchor 1102 can include a canular portion such as the canular portion 206 discussed with respect to FIGS. 2A-2C (such canular portion depicted as overlaid by the apparatus 1106 in FIGS. 11A-11B). In one embodiment, a strand 1104 can comprise a sheath, and the sheathed strand 1104 can be engaged with the canular portion of the anchor 1102; for example, the sheathed strand 1104 can be inserted into or around the canular portion of the anchor 1102. In another embodiment, the cold shrink 1106 can be preinstalled on the anchor 1102 or strand 1104, such that when the anchor 1102 and strand 1104 are engaged (such as to form a tendon), the cold shrink 1106 can be disposed over the juncture of the anchor 1102 and strand 1104. Preferably, preinstallation of the cold shrink 1106 can refer to the positioning of the cold shrink 1106 on the tendon before the cold shrink 1106 is collapsed on and/or secured to the tendon. In one embodiment, preinstallation of the cold shrink 1106 can facilitate the engaging of the strand 1104 with the anchor 1102, such as by guiding a tendon fabricator in threading the sheathed strand 1104 through the anchor 1102, such as through the canular portion of the anchor 1102. Once correctly positioned, the cold shrink 1106 can be collapsed or shrunk to, for example, seal the juncture between the strand 1104 and the anchor 1102.

In one embodiment, the cold shrink apparatus 1106 can include a first end (leading end) 1108 and a second end (trailing end) 1110. In another embodiment, the member 1106 can include a sleeve (sleeve member) 1112 and a dilator 1114. In one embodiment, the dilator 1114 can be operable to hold the sleeve member 1112 in an expanded state until the dilator 1114 is removed. Preferably, the sleeve member 1112 can be prehensile in nature, such that without the dilator 1114 within the sleeve 1112 to distend the sleeve 1112, the sleeve 1112 can compress and collapse. In one embodiment, the sleeve 1112 can be of any material suitable to collapse upon removal of the dilator 1114. For example, the sleeve 1112 can include elastic material woven with rubber or plastic to allow the sleeve 1112 to shrink upon removal of the dilator 1113. In another embodiment, the sleeve 1112 can be of any material or design that is resistant to acids and alkalinity, such as is commonly found in cement. In another embodiment, the sleeve 1112 can be resistant to ultraviolet rays. In another embodiment, the sleeve 1112 can be made of a viscoelastic material, such that the sleeve 1112 can maintain prehensile properties while deforming or elongating to adapt to applied stresses. In another embodiment, the sleeve 1112 can be made of a polymeric material; in another embodiment, the sleeve 1112 can be made of a hydrophobic material. For example, a sleeve 1112 having a viscoelastic polymeric hydrophobic composition can elongate significantly (for example, up to 200% of its original length) while maintaining prehensile and liquid-impermeable properties. In another embodiment, the sleeve 1112 can be made of ethylene propylene diene monomer rubber (EDPM). In one embodiment, the cold shrink member 1106 can be any tube or wrapping operable to be placed over a juncture between an anchor and a strand and constrict to bond to the anchor and the stand without the application of heat.

In one embodiment, removing the dilator 1114 from the sleeve 1112 can cause contraction of the sleeve 1112 to facilitate bonding of the apparatus 1106 to, for example, a canular portion of an anchor 1102 and a strand 1104, such as the sheath of a sheathed strand 1104; an example of such bonding can be seen in FIG. 11A. For example, in this manner, the apparatus 1106 can facilitate the jacketing of the anchor-strand juncture. In one embodiment, embossing 1116 of the canular portion of the anchor 1102 can provide grip to the apparatus 1106, such that when the sleeve 1112 contracts on the anchor 1102, the embossing 1116 can be disposed within and clutched by the contracted sleeve 1112. In another example, the embossing 1116 can be apparent from within the sleeve 1112 after the sleeve 1112 bonds to the canular portion of the anchor 1102, such as can be seen in FIG. 11A. In one embodiment, the dilator 1114 can take the form of a helical wire disposed within the sleeve 1112 that is adequate to distend the sleeve 1112 against the compression strength of the sleeve 1112. In another embodiment, the dilator 1114 can be of any suitable make or design to buttress the sleeve 1112 against collapse and subsequently be removed from the sleeve 1112 to selectively enable such collapse of the sleeve 1112. For example, the dilator 1114 can be an inner-tube operable to slide over the strand 1104 and out of the sleeve 1112 after engagement of the strand 1104 with the anchor 1102 and subsequently be removed from the strand 1104, such as by cutting or disengaging a clasp of the inner tube. As another example, the dilator 1114 can be threads or stitching within the sleeve 1112 configured to brace the inner walls of the sleeve 1112 against compression, the threads including a trailing thread exiting the sleeve 1112 that can be pulled to facilitate the breakage of the threads and selectively allow collapse of the sleeve 1112. In one embodiment, the removal of the dilator 1114 can cause the sleeve 1112 to collapse end-to-end. For example, as the helical wire 1114 is pulled away from the apparatus 1106, the sleeve 1112 can begin to compress at the leading end 1108, and as more of the wire 1114 is removed from the apparatus 1106, the rest of the sleeve 1112 can gradually and unidirectionally compress until the trailing end 1110 collapses last.

In another embodiment, the leading end 1108 of the apparatus 1106 can be configured to, for example, abut or engage an anchor, like anchor 1102. For example, the leading end 1108 can include a lip or rib configured to smoothly contact the anchor 1102. In another example, the leading end 1108 can be sized to overlay and snugly engage a lip of the anchor 1102, such as to secure or lightly secure the apparatus 1106 to the anchor 1102. In another example, the leading end 1108 can be configured to traverse or snugly engage ridges, textures, or corrugations (such as embossing 1116, or 212 from FIGS. 2A-2C) on the canular portion of the anchor 1102; in one example, such engagement can facilitate the guidance of an installer of the apparatus 1106. In another embodiment, the apparatus 1106 can include a trailing end 1110. Preferably, the trailing end 1110 can be configured to facilitate removal of the dilator 1114 from the apparatus 1106. For example, the trailing end 1110 can be, e.g., wider than the leading end 1108 to allow access to the dilator 1114 by an installer such that the installer can remove the dilator 1114 from the sleeve 1112. In another example, the trailing end 1110 can include an end or ends of a helical wire that, as pulled away from the apparatus 1106, enables the sleeve 1112 to collapse. In another example, a portion of the dilator 1114 can protrude from the trailing end 1110 such that it can be accessible to facilitate removal.

Preferably, the apparatus 1106 can be configured to jacket a juncture between an anchor 1102 and strand 1104, even over asymmetrical connections. For example, as seen in FIG. 11A, the apparatus 1106 can be configured to jacket a canular portion of an anchor 1102 and sheath of a strand 1104 or sheathed strand 1104 when these two elements to be jacketed have dissimilar diameters. For example, if a canular portion of an anchor 1102 has a larger diameter (such that, for example, a sheathed strand 1104 can engage the anchor 1102 by inserting within the canular portion) than the strand 1104, the sleeve 1112 of the apparatus 1106 can collapse such that it bonds to both the anchor 1102 and the strand 1104, effectively jacketing the juncture therebetween. In one embodiment, the apparatus 1106 can be configured to accomplish jacketing of asymmetric connections via the material from which the sleeve 1112 is made, such as an embodiment wherein the sleeve 1112 is of material operable to conform to varying shapes and/or diameters.

In some embodiments, the prehensile nature of the cold shrink can have a shrink rate of 3:1. In another embodiment, the cold shrink can prevent a sheath of a strand from disengaging with an anchor or otherwise removing itself from the cold shrink, such as can occur after the tendon has been preinstalled at a job site or during the holding period before the tendon is placed in the formwork. In some embodiment, the cold shrink tube can further eliminate the risk of moisture penetrating the anchor cavity. The bond formed between, e.g., the cold shrink and a canular portion of an anchor can be configured to include an "active memory," such that the cold shrink is continuously tightening around the anchor and/or the sheath of a strand. In one embodiment, such active memory can be accomplished via the material of the sleeve of the cold shrink. In one embodiment, with respect to installation of a cold shrink on a sheathed strand, the strand can be allowed to move freely during stressing or tensioning to a desired elongation while permeation of water, even at a juncture between an anchor and a strand, can be prevented.

In some embodiments, the cold shrink apparatus 1106 can be more user-friendly than other methods known in the art. For example, in one embodiment, the apparatus 1106 can function without the use of special or dedicated tools, as the apparatus 1106 can be preinstalled and bonded by hand. In another embodiment, the apparatus 1106 can be used regardless of a sheathing thickness of a sheathed strand. For example, as discussed with respect to FIGS. 11A-11B, the apparatus 1106 can facilitate bonding or jacketing between a canular portion of an anchor and a sheath of a sheathed strand when such elements are of dissimilar diameters. In another embodiment, the cold shrink can be installed, without the use of heat, in temperatures ranging from −15° Fahrenheit (−26° Celsius) up to 158° F. (70° C.) while maintaining a protecting and watertight seal. In another embodiment, the apparatus 1106 can be used to repair a compromised coupler (e.g., heat shrink coupler) on a job site.

The systems and members discussed herein can be configured to engage with one another in a system, such as system 100 and 800. For example, an anchor can comprise a coupling mechanism to facilitate coupling to a pocket-former, as discussed herein. It will be understood by those in the art that a coupling mechanism can be divided between two components—for example, a coupling mechanism that comprises threads located on two different components can enable those components to couple with one another. The two sets of threads can be considered two separate parts of the same coupling mechanism. For example, a member can comprise a first part of a two-part coupling mechanism (for example, threads, a rim with a beveled lip, a part of a quick connect, a latch, or any other suitable part of a mechanical coupling mechanism), and another member can comprise a second part of a two-part coupling mechanism (for example, threads, a receiving rim for a rim with a beveled lip, another part of a quick connect, a keeper for a latch, or any other suitable part of a mechanical coupling mechanism that can corresponding to the first part of the coupling mechanism). In another embodiment, one component can comprise a coupling mechanism that is one-sided, for example, a rim with a beveled lip that can insert into a cavity of an anchor collar to facilitate coupling. In another embodiment, components herein can be configured to engage one another through any collection of mechanisms or designs such as those discussed herein. A pocket-former can be configured to engage with an anchor via threads or other coupling mechanism; by comprising an inner tube and an outer tube that creates a space therebetween that can receive a portion of a collar of an anchor; or by some other means of engagement known in the art or described herein. A pocket-former can similarly be configured to engage with a bolt, or a bolt with a pocket-former. In another embodiment, the members discussed herein can be designed such that coupling can be accomplished via tapering of a given area to facilitate insertion of the tapered area into a receiving area. For example, an anchor collar like one discussed herein can have a tapered end, such that the collar can insert into an end of a pocket-former member.

The present disclosure offers several advantages in the art. A pocket-former such as those discussed herein can be designed to fit on the outside of a collar of an anchor to form a seal or gasket via the shape, fitment, or design of the pocket-former and/or anchor or anchor collar. The pocket-former can have a receiving helical threaded member on the interior of the tubular section (such as 310 depicted in FIGS. 3A-3C), and such tubular section and corresponding helices can be either straight or tapered; this can enable the pocket-former to positively retain to the form board via the threaded fastener (bolt or bolt member) turned either clockwise or counterclockwise direction. In one embodiment, pressure exerted between the bolt and pocket-former (such as via a flange of the bolt) can sandwich the form board therebetween, retaining the pocket-former against the form; in another embodiment, engaging the bolt with the pocket-former can cause a slight elastic deformation or expansion, causing a hole in the form to be filled with the pocket-former and inserted bolt. In one embodiment, such mechanisms described above can positively connect an anchor with an angular ridge (for example, as seen at 204 and 210 in FIGS. 2A-2C) fitted to the collar of the encapsulated anchor with a mechanical connection. The encapsulated anchor can include a bare anchor over-molded with a plastic and a sheathed or unsheathed tendon in place before the concrete is poured.

Accordingly, and in one embodiment, via the interior receiving helical threaded member of the pocket-former discussed above, the adhesion of concrete slag to, e.g., collar threads or threads of a bolt can be prevented—such adhesion would otherwise not allow the pocket-former to secure properly to the form board. The interior helical threads can also allow for a faster assembly time by reducing the amount of turns needed to secure the system—in one embodiment, only two full turns can be needed to fully secure the pocket-former to an anchor or bolt, effectively connecting the opposing members together and forming a nail-less pocket-former assembly 100, 800.

Further, a pocket-former discussed herein can have a frustoconical shape. Threaded fasteners discussed herein (i.e. 204, 312, 310, 402, etc.) can have slits or pores along the helical threading to improve the speed at which the fastener can facilitate joining of any given members, reducing worker fatigue and the misplacement of the post-tensioning system that could result. Additionally, the collar of the of anchor can abut an interior surface of a pocket-former when the two members have been coupled or engaged, and such coupling or engagement can form a critically-protective seal between the inner surface of the anchor and the slurry. In this manner, a clean pocket can be formed that protects the anchor and tendon from unwanted debris, thus allowing the jack to tension the wedges of the anchor onto a tendon (in one embodiment, a seven-wire strand) without the risk of unwanted concrete slurry, dirt, or rust entering the inside the anchor or pocket and interfering with the connection between the wedges and tendon. The presence of concrete slurry, dirt, or rust could otherwise cause the wedges of the anchor to be misaligned, causing the mechanical connection between the tapered bearing surface of the anchor and the seven-wire strand to be unstable. This could cause the strand to slip back into the sheathing or worse—the wedges could only seat momentarily and then release during final inspection or at later date, causing the slab to become unstable and ultimately threatening health and safety.

Additionally, the system can prevent the sheathing from dislodging itself after the tendon has been preinstalled at a job site or during the holding period before the tendons are placed in the formwork, such as via the cold shrink discussed here. The cold shrink can be abrasion resistant, protecting the sheathing from being scored or slashed during placement caused by varying factors (e.g., by the surrounding preplaced rebar). Further, the present disclosure offers the following advantages:

1. Providing a post-tensioning system that facilitates connection to, for example, a form board, without the use of nails;
2. Providing a method of post-tensioning that mitigates a risk of jeopardizing encapsulation of an anchor that could ultimately lead to corrosion;
3. Providing a way to seal a juncture between an anchor and a strand without requiring the application of heat;
4. Increasing efficiency of post-tensioning methods and systems by facilitating connection to a form board without the use of nails or other components whose installation is arduous, slow, and potentially hazardous to members of the system;
5. Enhanced pocket-forming and post-tensioning by providing a pocket-former that facilitates connection of an anchor to a form without nails, and without having to couple a bolt member directly to an anchor member;
6. Providing a new use for a pocket-former by enabling the pocket-former to facilitate connection of an anchor to a form; and
7. User-friendly post-tensioning system that utilizes easy-to-operate couplings and mechanisms to facilitate easier and faster post-tensioning.

What is claimed is:

1. A post-tensioning system, the system comprising:
an anchor member;
a pocket-former member comprising a first end and a threaded second end;
a bolt member comprising a first end, a threaded second end, and a flange; and
a cold shrink member;
wherein the anchor member further comprises a tube end and collar distal to the tube end that includes a first anchor coupler;
wherein the first end of the pocket-former member further comprises a second anchor coupler, and is configured to removably engage the first anchor coupler;
wherein the threaded second end of the pocket-former member is configured to removably engage the threaded second end of the bolt member; and
wherein the cold shrink member comprises an elastomeric material pre-expanded over a removable dilator, and wherein removal of the dilator allows the cold shrink member to contract around the tube end.

2. The system of claim 1, wherein the first anchor coupler comprises a first set of threads, and the second anchor coupler comprises a second set of threads configured to mate with the first set of threads.

3. The system of claim 1, wherein the first end of the pocket-former member is configured to form a seal with the anchor member when the first end of the pocket-former member is engaged with the anchor member.

4. The system of claim 1, further comprising a cap member configured to be inserted into the collar of the anchor member to seal the tendon sheared within.

5. The system of claim 4, wherein the cap member is threaded, and is configured to sealingly engage threads of the first anchor coupling at the collar of the anchor member.

6. The system of claim 4, wherein the cap member further comprises a seal consisting of at least one selected from the group of an O-ring, adhesive, or wax.

7. The system of claim 1, wherein the threaded second end of the pocket former member is configured to be inserted partially through an aperture of a form, and the flange is configured to exert pressure on the form when the threaded second end of the bolt member is threaded into the threaded second end of the pocket former member.

8. The system of claim 1, wherein the first end of the bolt member is open to allow a tendon to pass completely therethrough.

9. The system of claim 1, wherein the first end of the bolt member is closed to facilitate sealing a sheared tendon within the pocket former member.

10. A method of providing support to a masonry structure, the method comprising the steps of:
   providing an anchor member having a collar with a first anchor coupling and a tubular end distal to the collar;
   removably engaging the first anchor coupling with a first end of a pocket-former member;
   inserting a threaded second end of the pocket former partially through an aperture in a first side of a form, and
   engaging a second end of the pocket-former member with a threaded bolt member having a flange through the aperture from a second side of the form opposite the pocket former; and
   securing a cold shrink tube over the tubular end of the anchor member and a portion of a tendon inserted therethrough;
   wherein engaging the threaded second end of the pocket-former member with the threaded bolt member secures the pocket-former member to the form when the bolt is tightened into threads of the threaded second end of the pocket former and the flange exerts pressure on side the form; and
   wherein securing the cold shrink tube over the tubular end of the anchor member and the portion of the tendon comprises the steps of:
      placing a pre-expanded cold shrink tube having an internal dilator over at least a portion of the tubular end of the anchor member and the portion of the tendon inserted therethrough; and
      removing the dilator from the interior of the pre-expanded cold shrink tube such that the pre-expanded cold shrink tube contracts around the tubular end of the anchor member and the portion of a tendon.

11. The method of claim 10, wherein the first end of the pocket-former member comprises a second anchor coupling configured to engage with the first anchor coupling.

12. The method of claim 11, wherein the first anchor coupling and the second anchor coupling are respectively threaded to engage each other.

13. The method of claim 10, wherein the first end of the pocket-former member is configured to form a seal with the anchor member when the first end of the pocket-former member is engaged with the anchor member.

\* \* \* \* \*